US012526635B2

United States Patent
Freeman et al.

(10) Patent No.: US 12,526,635 B2
(45) Date of Patent: *Jan. 13, 2026

(54) COMMUNICATION ENABLED CIRCUIT BREAKERS

(71) Applicant: LEVITON MANUFACTURING CO., INC., Melville, NY (US)

(72) Inventors: Scott Freeman, Russiaville, IN (US); Abhishek Golwala, Charlotte, NY (US); Rejaul Monir, Jamaica Hills, NY (US); Michael Ostrovsky, Brooklyn, NY (US); Alfred J. Lombardi, Syosset, NY (US); Ozgur Keser, Melville, NY (US); Adam Kevelos, Plainview, NY (US); Paul Soccoli, Plainview, NY (US); Justin Berghoff, Asheville, NC (US)

(73) Assignee: Leviton Manufacturing Co., Inc., Melville, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/135,333

(22) Filed: Apr. 17, 2023

(65) Prior Publication Data

US 2023/0254697 A1    Aug. 10, 2023

Related U.S. Application Data

(63) Continuation of application No. 17/552,715, filed on Dec. 16, 2021, now Pat. No. 11,638,157, which is a (Continued)

(51) Int. Cl.
*G01R 31/327*     (2006.01)
*G01R 31/74*      (2020.01)
(Continued)

(52) U.S. Cl.
CPC ........ *H04W 12/50* (2021.01); *G01R 31/3277* (2013.01); *G01R 31/74* (2020.01);
(Continued)

(58) Field of Classification Search
CPC ...... H02J 13/00; G01R 31/74; G01R 31/3277
See application file for complete search history.

(56) References Cited

U.S. PATENT DOCUMENTS 5,223,795 A    6/1993   Blades
5,436,604 A    7/1995   Mrenna et al.
(Continued)

FOREIGN PATENT DOCUMENTS

| EP | 3002648 A2 | 4/2016 |
|---|---|---|
| WO | 2011091429 A2 | 7/2011 |
| WO | 2014018434 A2 | 1/2014 |

OTHER PUBLICATIONS

International Search Report and Written Opinion for Application No. PCT/US2018/019857, mailed on Jun. 27, 2018, 14 pages.
(Continued)

*Primary Examiner* — Nabil H Syed
(74) *Attorney, Agent, or Firm* — KDW Firm PLLC

(57) ABSTRACT

Wireless communication enabled circuit breakers are described. Methods associated with such wireless communication enabled circuit breakers are also described. The wireless communication enabled circuit breakers may controlled by a remote entity. The remote entity may wirelessly case the wireless communication enabled circuit breakers to trip.

23 Claims, 9 Drawing Sheets

Related U.S. Application Data continuation of application No. 16/487,479, filed as application No. PCT/US2018/019856 on Feb. 27, 2018, now Pat. No. 11,228,912.

(60) Provisional application No. 62/612,657, filed on Jan. 1, 2018, provisional application No. 62/612,654, filed on Jan. 1, 2018, provisional application No. 62/612,656, filed on Jan. 1, 2018, provisional application No. 62/500,051, filed on May 2, 2017, provisional application No. 62/465,046, filed on Feb. 28, 2017.

(51) Int. Cl.

| | |
|---|---|
| *G05B 13/02* | (2006.01) |
| *G05B 19/042* | (2006.01) |
| *G06F 8/65* | (2018.01) |
| *G08B 5/36* | (2006.01) |
| *G08C 17/02* | (2006.01) |
| *H01H 71/04* | (2006.01) |
| *H02H 1/00* | (2006.01) |
| *H02H 3/10* | (2006.01) |
| *H02H 7/26* | (2006.01) |
| *H04L 9/08* | (2006.01) |
| *H04L 12/28* | (2006.01) |
| *H04L 67/00* | (2022.01) |
| *H04Q 9/00* | (2006.01) |
| *H04W 4/80* | (2018.01) |
| *H04W 12/03* | (2021.01) |
| *H04W 12/0471* | (2021.01) |
| *H04W 12/50* | (2021.01) |
| *H04W 76/11* | (2018.01) |
| *H04W 76/14* | (2018.01) |
| *G06F 7/58* | (2006.01) |

(52) U.S. Cl.

CPC ....... *G05B 13/028* (2013.01); *G05B 19/0426* (2013.01); *G06F 8/65* (2013.01); *G08B 5/36* (2013.01); *G08C 17/02* (2013.01); *H01H 71/04* (2013.01); *H02H 1/0007* (2013.01); *H02H 1/0061* (2013.01); *H02H 1/0092* (2013.01); *H02H 3/10* (2013.01); *H02H 7/263* (2013.01); *H04L 9/0841* (2013.01); *H04L 12/2816* (2013.01); *H04L 67/34* (2013.01); *H04Q 9/00* (2013.01); *H04W 4/80* (2018.02); *H04W 12/03* (2021.01); *H04W 12/0471* (2021.01); *H04W 76/11* (2018.02); *H04W 76/14* (2018.02); *G05B 2219/25112* (2013.01); *G06F 7/588* (2013.01); *G08C 2201/93* (2013.01); *H04L 2209/805* (2013.01); *H04Q 2209/43* (2013.01)

(56) References Cited

U.S. PATENT DOCUMENTS

| | | | |
|---|---|---|---|
| 5,467,286 A | 11/1995 | Pyle et al. | |
| 5,486,755 A | 1/1996 | Horan et al. | |
| 5,629,869 A | 5/1997 | Johnson et al. | |
| 5,805,813 A | 9/1998 | Schweitzer, III | |
| 6,034,586 A | 3/2000 | Runyan | |
| 6,055,144 A | 4/2000 | Reid | |
| 6,195,243 B1 | 2/2001 | Spencer et al. | |
| 6,246,928 B1 | 6/2001 | Louis et al. | |
| 6,292,717 B1 | 9/2001 | Alexander et al. | |
| 6,295,190 B1 | 9/2001 | Rinaldi et al. | |
| 6,473,794 B1 | 10/2002 | Guheen et al. | |
| 6,628,496 B2 | 9/2003 | Montijean | |
| 7,493,221 B2 | 2/2009 | Caggiano et al. | |
| 7,546,214 B2 | 6/2009 | Rivers, Jr. et al. | |
| 7,558,038 B2 | 7/2009 | Wiese et al. | |
| 7,719,257 B2 | 5/2010 | Robarge et al. | |
| 8,463,453 B2 | 6/2013 | Parsons, Jr. | |
| 8,681,463 B2 | 3/2014 | Franks et al. | |
| 8,719,123 B2 | 5/2014 | Rohrbaugh | |
| 9,432,214 B2 | 8/2016 | Lal et al. | |
| 9,438,026 B2 | 9/2016 | Franks et al. | |
| 9,715,796 B2 | 7/2017 | Reid | |
| 9,853,458 B1 | 12/2017 | Bell | |
| 10,063,592 B1 | 8/2018 | McClintock | |
| 2002/0075616 A1 | 6/2002 | Montjean | |
| 2003/0086228 A1 | 5/2003 | Papallo | |
| 2003/0167373 A1 | 9/2003 | Winters et al. | |
| 2005/0116814 A1 | 6/2005 | Rodgers et al. | |
| 2005/0168891 A1 | 8/2005 | Nilman-Johansson | |
| 2005/0225909 A1 | 10/2005 | Yoshizaki | |
| 2006/0050870 A1 | 3/2006 | Kimmel et al. | |
| 2006/0087783 A1 | 4/2006 | Holley | |
| 2006/0238932 A1 | 10/2006 | Westbrock et al. | |
| 2007/0143043 A1 | 6/2007 | Wafer et al. | |
| 2007/0188954 A1 | 8/2007 | Wiese et al. | |
| 2007/0194942 A1 | 8/2007 | Darr | |
| 2008/0079437 A1 | 4/2008 | Robarge et al. | |
| 2008/0142486 A1 | 6/2008 | Vicente et al. | |
| 2008/0209429 A1 | 8/2008 | Van Riel | |
| 2008/0231485 A1 | 9/2008 | Newlin et al. | |
| 2008/0255782 A1 | 10/2008 | Bilac et al. | |
| 2009/0206059 A1* | 8/2009 | Kiko | G05F 1/66 218/143 |
| 2010/0057387 A1* | 3/2010 | Kagan | G01R 22/065 702/62 |
| 2011/0150482 A1 | 6/2011 | Furusawa et al. | |
| 2011/0279933 A1 | 11/2011 | Campolo et al. | |
| 2012/0098347 A1 | 4/2012 | Beierschmitt et al. | |
| 2012/0123762 A1 | 5/2012 | Studer, II | |
| 2012/0140431 A1 | 6/2012 | Faxvog et al. | |
| 2012/0262093 A1 | 10/2012 | Recker et al. | |
| 2013/0029596 A1 | 1/2013 | Preston et al. | |
| 2013/0329331 A1 | 12/2013 | Erger | |
| 2014/0134951 A1 | 5/2014 | Paulson | |
| 2014/0146431 A1 | 5/2014 | Franks et al. | |
| 2014/0193294 A1 | 7/2014 | Kain et al. | |
| 2014/0197856 A1 | 7/2014 | Ostrovsky et al. | |
| 2014/0211345 A1 | 7/2014 | Thompson | |
| 2014/0300486 A1 | 10/2014 | Hummel et al. | |
| 2014/0340222 A1 | 11/2014 | Thornton et al. | |
| 2015/0162157 A1 | 6/2015 | Luebke et al. | |
| 2015/0168487 A1* | 6/2015 | Parker | H02H 1/0053 702/58 |
| 2015/0188975 A1 | 7/2015 | Hansen | |
| 2015/0207301 A1 | 7/2015 | Franks et al. | |
| 2015/0296599 A1 | 10/2015 | Recker et al. | |
| 2015/0338472 A1 | 11/2015 | Nuqui | |
| 2016/0099749 A1 | 4/2016 | Bennett et al. | |
| 2016/0100310 A1 | 4/2016 | Lee | |
| 2016/0163186 A1 | 6/2016 | Davidson | |
| 2016/0181036 A1 | 6/2016 | Langdon | |
| 2016/0225562 A1* | 8/2016 | Franks | H02H 3/006 |
| 2016/0231375 A1 | 8/2016 | Roemer et al. | |
| 2016/0282828 A1 | 9/2016 | Jauquet et al. | |
| 2017/0005462 A1 | 1/2017 | Williams | |
| 2017/0064798 A1 | 3/2017 | Economy et al. | |
| 2017/0163023 A1 | 6/2017 | Niehoff | |
| 2018/0129801 A1 | 5/2018 | Cambou | |
| 2018/0278724 A1 | 9/2018 | Erdelyi | |
| 2020/0264234 A1 | 8/2020 | Miller et al. | |

OTHER PUBLICATIONS

International Search Report and Written Opinion for Application No. PCT/US2018/019852 mailed on May 15, 2018, 13 pages.
International Search Report and Written Opinion for Application No. PCT/US2018/019859, mailed on May 16, 2018, 11 pages.
International Search Report and Written Opinion for Application No. PCT/US2018/019856, mailed on May 11, 2018, 14 pages.

(56) References Cited

OTHER PUBLICATIONS

Allen-Bradley, Rockwell Software Rockwell Automation, "Supplementary Protectors/Miniature circuit breakers" Catalog Nos. 1492-SP Series C, Apr. 2011, p. 31.
Elmark, "Technical Specification—Minature circuit breakers (MCB) C60DC Series", pp. 3 and 4.
Techterms, "Overwrite", Techterms.com/definition/overwrite, Feb. 29, 2012.

* cited by examiner

COMMUNICATION ENABLED CIRCUIT BREAKERS

CROSS-REFERENCE TO RELATED APPLICATIONS

This application is a continuation application of pending U.S. patent application Ser. No. 17/552,715, filed Dec. 16, 2021, which application is a continuation application of U.S. patent application Ser. No. 16/487,479, filed Aug. 21, 2019, now U.S. Pat. No. 11,228,912, which application is a United States National Phase filing of International Application No. PCT/US2018/019856, filed Feb. 27, 2018, which claims the benefit of U.S. Provisional Application Ser. No. 62/465,046, filed Feb. 28, 2017, entitled "Wireless Communication Enabled Circuit Breakers and Circuit Breaker Panels;" U.S. Provisional Application Ser. No. 62/500,051, filed May 2, 2017, entitled "Wireless Communication Enabled Circuit Breakers and Circuit Breaker Panels;" U.S. Provisional Application Ser. No. 62/612,654, filed Jan. 1, 2018, entitled "Secure Communication for Commissioning and Decommissioning Circuit Breakers and Panel System;" U.S. Provisional Application Ser. No. 62/612,656, filed Jan. 1, 2018, entitled "Communication Enabled Circuit Breakers;" and U.S. Provisional Application Ser. No. 62/612,657, filed Jan. 1, 2018, entitled "Communication Enabled Circuit Breakers;" which applications are incorporated herein by reference in their entirety.

FIELD OF THE DISCLOSURE

The present invention relates generally to circuit breakers. More particularly, the present invention relates to communication enabled circuit breakers and circuit breaker panels that house circuit breakers.

BACKGROUND OF THE DISCLOSURE

Circuit breakers provide protection in electrical systems by disconnecting a load from a power supply based on certain fault conditions, e.g., ground fault, arc fault, overcurrent. In general, circuit breakers monitor characteristics of the electrical power supplied to branch circuits. The circuit breakers function to automatically interrupt, open, 'trip' or 'break' the connection between the power supply and a branch circuit when fault conditions (e.g., arc faults, ground faults, and unsafe overcurrent levels) are detected on the supplied branch, e.g., automatically open a switch to disconnect the branch from the power supply when such fault conditions are detected.

Existing circuit breaker panels and circuit breakers housed by such panels may provide limited information to electricians and consumers about the nature of the fault conditions observed by circuit breakers. For example, electricians and consumers may be able to determine that a circuit breaker has tripped by visual inspection of the circuit breaker or if power is lost on one or more loads. The visual inspection of the circuit breaker generally requires observing an operating switch associated with the circuit breaker. The operating switch of the circuit breaker is provided to allow for manually opening and closing contacts of the circuit breaker. The operating switch is also typically used to reset the circuit breaker after the circuit breaker has tripped due to a detected fault condition.

It is to be appreciated, that circuit breakers are typically installed in circuit breaker panels, which are themselves typically located in dedicated electrical rooms, basements, garages, or outdoor spaces. Additionally, circuit breaker panels often include a door or cover that limits access to the circuit breakers housed therein. Therefore, locating, inspecting and/or resetting deployed circuit breakers may be difficult. Furthermore, because circuit breakers generally require visual inspection to determine if a fault condition has occurred, property owners and/or residents may not immediately recognize when an electrical fault condition has caused a circuit breaker to trip. Failure to immediately recognize when an electrical fault condition has caused a circuit breaker to trip may cause damage to property and/or personal effects due to a loss of electricity to one or more loads.

DETAILED DESCRIPTION

Figure 1:
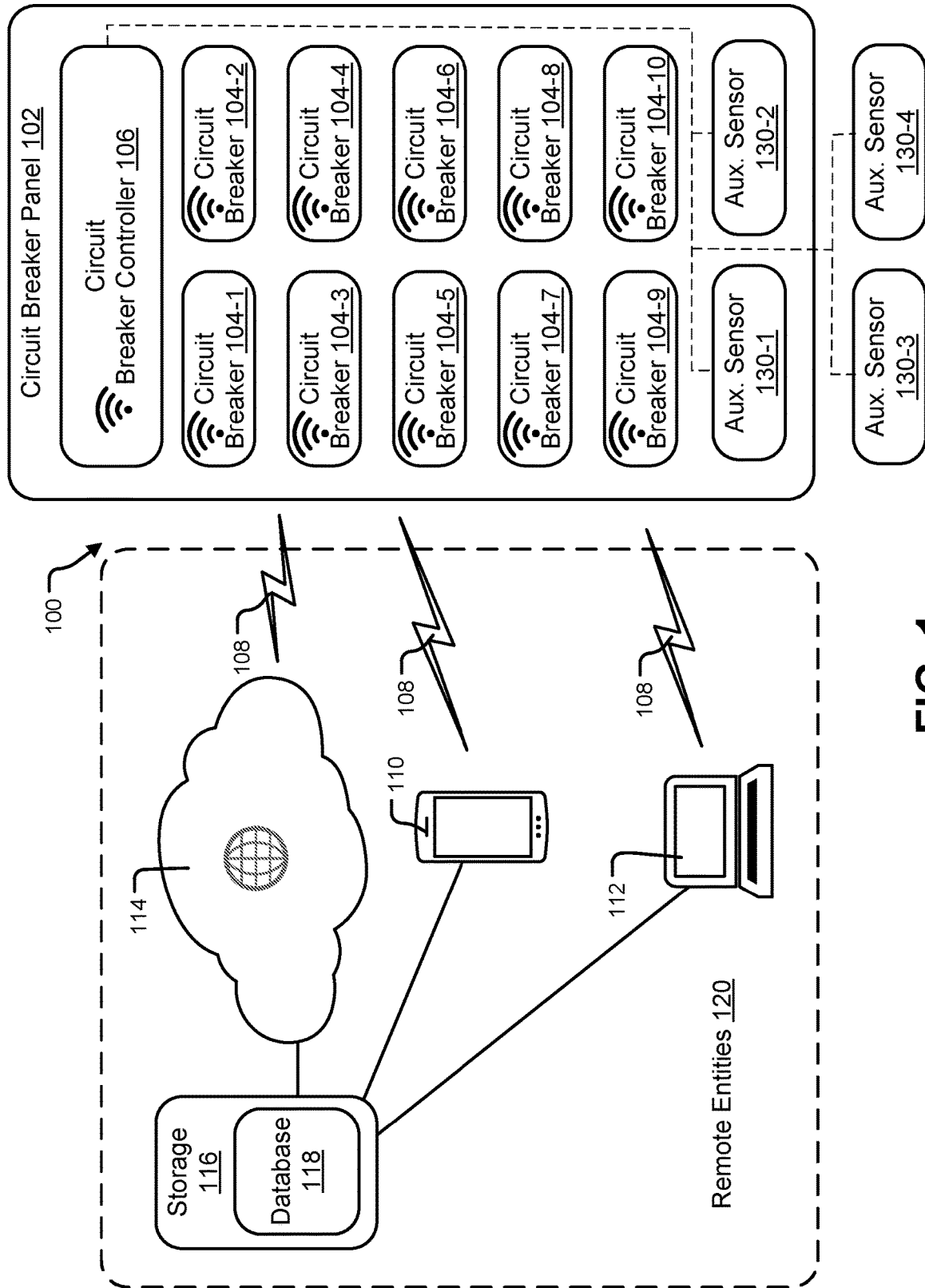
FIG. 1 illustrates a communication enabled circuit breaker and panel system in accordance with an exemplary embodiment; breaker.

Communication enabled circuit breakers and circuit breaker panels are provided. Methods associated with such communication enabled circuit breakers and circuit breaker panels are also provided.

In some embodiments, it is possible to remotely communicate with at least one of the communication enabled circuit breakers and/or circuit breaker panels. The remote communication may be accomplished using a wired or wireless communication link. In some implementations, remote communication with the communication enabled circuit breakers/panels is made possible through the Internet. For example, one or more devices coupled to the Internet may communicate with the communication enabled circuit breakers/panels. In another implementation, a computing device may directly communicate (e.g., via a PAN or MESH network) to one or more of the communication enabled circuit breakers/panels, thereby eliminating the necessity of communicating through a WAN/LAN; e.g., the Internet. In some implementations, the communication enabled circuit breakers may be controlled remotely. For example, a computing device coupled to the communication enabled circuit breakers may be used to remotely control the communication enabled circuit breakers. In some implementations, the computing device may remotely trip or disable one or more of the communication enabled circuit breakers. In some implementations, the computing device may remotely reset or enable one or more of the communication enabled circuit breakers. In some examples, the computing device may remotely view and/or determine a status of the breaker. It is noted that the term "reset" may be used interchangeably with the term "set" when referring to manipulating the status of the breaker.

The embodiments detailed herein provide a circuit breaker including a current sensor arranged to measure current within the breaker. More specifically, the current sensor can be arranged to measure current between a line side phase and neutral connections and a load side phase and neutral connections of the breaker. Additionally, the breaker can include communication components configured to transmit information including indications of the measured current. For example, a computing device may remotely obtain data or information related to operation of one or more of the communication enabled circuit breakers. Such data or information can include, detected fault signatures, power metering metrics (e.g., voltage, current, watts, etc.), power metering metrics incident to a detected fault, or the like. Such data and information may be added to a database or data repository, for example, on a cloud-based database. Furthermore, such related information may be useful in tracking power usage of loads coupled to individual branch circuits.

In further examples, a user may be notified of detected faults, received power metering information, or the like. In some examples, faulty wiring, load types (e.g., HVAC systems, refrigerators, televisions, and computers), failing loads (e.g., failing refrigerator compressor, or the like) may be identified from data or information received from the wireless communication enabled circuit breakers. Additionally, the computing device may remotely update one or more of the communication enabled circuit breakers, such as, updating a firmware with a custom or load specific fault detection logic. In general, the firmware can include logic related to detection of fault conditions that would cause the wireless communication enable circuit breaker to trip.

It is noted that the present disclosure often uses examples of communication enabled circuit breakers and panels, which may be wirelessly coupled. It is to be appreciated that the examples given herein can be implemented using wired communication technologies (e.g., Ethernet, RS232, USB, or the like) instead of wireless communication technologies. As such, the use of the term "wireless" when referring to the communication technologies that may be implemented by the breakers and/or panels is not intended to be limiting to breakers and panels which only communicate wirelessly. Furthermore, system components can be referred to as "wireless" without implying that the elements recited thereto are devoid of wires or physical conductors/conductive paths. Lastly, the present disclosure could implement a breaker and panel system where the breakers communicate with the panel via a wired link without departing from the spirit and scope of the disclosure.

FIG. 1 illustrates a communication enabled circuit breaker and panel system 100 in accordance with an exemplary embodiment. The communication enabled circuit breaker and panel system 100 includes a circuit breaker panel 102. The circuit breaker panel 102 may include any number of communication enabled circuit breakers 104-n, where n is a positive integer. For example, system 100 is depicted including communication enabled circuit breakers 104-1, 104-2, 104-3, 104-4, 104-5, 104-6, 104-7, 104-8, 104-9 and 104-10. It is noted, system 100 is depicted with communication enabled circuit breaker 104-1 to 104-10 for purposes of clarity and not limitation. For example, system 100 can include panel 102 having any number (e.g., 1, 2, 3, 4, or more) of communication enabled circuit breakers 104-n. Additionally, panel 102 may include both communication enabled circuit breakers (e.g., 104-1 to 104-10) as well as conventional circuit breakers (not shown).

Additionally, although each of the communication enabled circuit breakers 104-1 to 104-10 are labeled as breaker 104, it is to be understood that communication enabled circuit breakers 104-1 to 104-10 are not necessarily identical. For example, communication enabled circuit breaker 104-1 may be a ground fault circuit interrupter (GFCI) device; communication enabled circuit breaker 104-2 may be an arc fault circuit interrupter (AFCI) device; communication enabled circuit breaker 104-3 may be a conventional overcurrent circuit breaker, an overcurrent hydraulic-magnetic circuit breaker, an overcurrent thermal magnetic circuit breaker, or the like; communication enabled circuit breaker 104-4 may include both GFCI and AFCI functionalities. Furthermore, each of the communication enabled circuit breakers 104-1 to 104-10 may be rated for a predefined trip amperage or overcurrent state, and not necessarily the same predefined trip amperage or overcurrent state.

Furthermore, communication enabled circuit breakers 104-1 to 104-10 may be shaped and sized differently. For example, communication enabled circuit breaker 104-1 may be a double pole circuit breaker having a 2 inch width; communication enabled circuit breaker 104-2 may be a single circuit breaker having a 1 inch width; communication enabled circuit breaker 104-2 may be a circuit breaker having a ¾ inch width; communication enabled circuit breaker 104-2 may be a circuit breaker having a 1 & ½ inch width; etc. The width of the communication enabled circuit breakers 104-1 to 104-10 refers to the shorter side of the generally rectangular visible face of the wireless circuit breakers 104-1 to 104-10 once it is installed in the circuit breaker panel 102.

Each of the communication enabled circuit breakers 104-1 to 104-10 may include communication components (refer to FIGS. 2-3), which is some examples can be wireless. Such communication components associated with each of the communication enabled circuit breakers 104-1 to 104-10 may enable the communication enabled circuit breakers 104-1 to 104-10 to communicate (e.g., send and/or receive information elements including data, indications of operating conditions, instructions, updated fault interruption instructions, or the like) using any of a variety of communication standards. For example, in the case of communication enabled communication, the wireless circuit breakers 104-1 to 104-10 can include wireless communication components arranged to communicate via a wireless communication protocol, e.g., Bluetooth® Low Energy (BLE), thus enabling the communication enabled circuit breakers 104-1 to 104-10 to communicate using BLE communication schemes. In the case of wired communication, the communication enabled circuit breakers 104-1 to 104-10 can include wired communication components arranged to communicate via a wired communication protocol, e.g., USB or MTP, thus enabling the wired circuit breakers to communicate using a wired communication scheme.

The circuit breaker panel 102 further houses a circuit breaker controller 106. The circuit breaker controller 106 may include communication components (refer to FIG. 4). In an alternative embodiment, the circuit breaker controller 106 is coupled to the circuit breaker panel 102 in an external arrangement. For example, the controller 106 could be housed in a different panel than panel 102 or disposed external to the panel 102. The communication components associated with the circuit breaker controller 106 may enable the controller 106 to communicate (e.g., send and/or receive information elements including data, indications of operating conditions, instructions, updated fault interruption instructions, or the like) using any of a variety of communication standards.

In general, the communication enabled circuit breakers 104-1 to 104-10 and the wireless circuit breaker controller 106 (and particularly, the wireless communication components of these devices) can be arranged to communicate using a variety of communication technologies, which may be wireless or wired in nature. For example, the circuit breaker controller 106 can be arranged to communicate via ZigBee®, Z-Wave, Bluetooth®, Bluetooth® Low Energy (BLE), 6LowPan, Thread, Cellular, Sigfox®, NFC, Neul®, LoRaWAN™, or the like. In some implementations, the communication enabled circuit breakers 104-1 to 104-10 and the circuit breaker controller 106 may communicate via wired (as opposed to wireless) technologies. For example, the communication enabled circuit breakers 104 may be communicatively coupled via a wired link to the circuit break controller 106.

The circuit breaker controller 106 may be configured to communicate via multiple communication components. For example, circuit breaker controller 106 may be configured to communicate with communication enabled circuit breakers 104-1 to 104-10 via BLE as described above. Additionally, the circuit breaker controller 106 can be configured to communicate (e.g., send and/or receive information elements including data, indications of operating conditions, instructions, updated fault interruption instructions, or the like) via a second wireless communication scheme or via a wired communication scheme. For example, circuit breaker controller 106 could include wireless communication components arranged to wirelessly communicate via Wi-Fi® technology, thus enabling the circuit breaker controller 106 to communicate using Wi-Fi communication schemes. Accordingly, the circuit breaker controller 106 can communicate with devices external to the circuit breaker panel 102 via wireless channel 108, for example, using Wi-Fi communication schemes. In general, however, the circuit breaker controller 106 may be enabled to communicate with devices external to the circuit breaker panel 102 using any suitable type of communication technology, either wireless or wired (e.g., BLE, 4G, LTE, Wi-Fi, USB, RS232, MTP, etc.).

Component from the circuit breaker panel 102 may communicate (e.g., wirelessly or wired) with one or more remote entities 120. For example, the communication enabled circuit breakers 104 and/or the circuit breaker controller 106 of panel 102 may communicate wirelessly with a mobile device 110 (e.g., tablet computer, mobile phone, etc.), a computing device 112 (desktop computer, server, etc.) and/or the Internet 114 (e.g., a server device or computing device linked to the Internet). For example, the communication enabled circuit breakers 104-1 to 104-10 can communicate with the circuit breaker controller 106, which can itself, wirelessly communicate with any one of remote entities 120. It is noted, remote entities 120 are depicted including mobile device 110, computing device 112, and Internet 114. However, remote entities 120 could include just a single device or entity remote to circuit breaker panel 120. The term remote entities 120 is used herein to refer to one or more devices remote to the panel 120, such as, for example, mobile device 110, computing device 112, and Internet 114. Furthermore, although the term remote entity 120 is sometimes used herein in the plural, it is not intended to imply or denote multiple devices or multiple entities remote to panel 102 but could simply refer to a single entity remote to the system (e.g., just the Internet 114, just the mobile device 110, or the like).

In some examples, the communication enabled circuit breakers 104-1 to 104-10 can directly couple to remote entities 120. For example, the mobile device 110 can communicate directly (e.g., via BLE) with at least one of the communication enabled circuit breakers 104-1 to 104-10. In addition, the circuit breaker panel 102 (e.g., via the circuit breaker controller 016) may include wireline connectivity functionality, such as an Ethernet port, to enable wireline communication with one or more remote entities. In some implementations, the communication enabled circuit breakers 104-1 to 104-10 may establish a mesh network. For example, communication enabled circuit breaker 104-1 may share a wireless connection with a remote entity 120 with communication enabled circuit breaker 104-2. Furthermore, in such a mesh network topology, communication enabled circuit breaker 104-2 may share the wireless connection to the remote entity 120 with communication enabled circuit breaker 104-3 and communication enabled circuit breaker 104-4. Therefore, using the mesh network topology, the wireless connection to the remote entity 120 may be shared between the communication enabled circuit breakers 104-1 to 104-10. The mesh network may be implemented in accordance with wireless communication schemes, or standards, such as, BLE standards, Wi-Fi standards, or the like. In some examples, the mesh network can be implemented in accordance with the Bluetooth Core Specification (e.g., Bluetooth Specification Version 4.2, 5.0, or the like). In some examples, the mesh network can be implemented in accordance with a combination of the Bluetooth Core Specification (e.g., Bluetooth Specification Version 4.2, 5.0, or the like) and proprietary mesh network overlay. In some examples, multiple systems 100, or more specifically, multiple controllers 106 from different, adjacent, related, or the like panel systems 102 might be coupled via a mesh network as detailed herein. As an example, a circuit breaker controller 106 from a main panel 102 might be communicatively coupled to a circuit breaker controller 106 of a sub-panel 102 via a mesh network provided by communication enabled circuit breakers 104 from both the main and sub-panels 102.

As described above, the circuit breaker controller 106 may communicate, or exchange signals, including data, information, or information elements including indications of operating conditions, fault detection events, fault signatures, updated fault detection logic, or the like between communication enabled circuit breakers 104-1 to 104-10 and remote entities 120. Various examples of the exchange of such signals, and examples of the content of such signals, are given further below when describing FIGS. 5-12.

In some embodiments, a remote entity 120 (e.g., mobile device 110, computing device 112, Internet 114, or the like) may include a storage 116 configured to store a database 118. Database 118 can store accounts and profiles associated with circuit breaker panels 102 deployed at various locations. In some implementations, the profiles may indicate the location (e.g., physical address, service address, location within the building of the service address, or the like) of deployed circuit breaker panels 102. In some implementations, an account can be associated with multiple circuit breaker panels 102, each of which can be deployed at the same service address or different service addresses. In some implementations, the profiles can include indications of the number, position, type (e.g., GFCI and/or AFCI), or the like of communication enabled circuit breakers 104-1 to 104-10 deployed in the circuit breaker panels 102. In some implementations, the profiles can include indications of the type of load or branch circuit to which the communication enabled circuit breakers 104-1 to 104-10 are attached.

In some implementations, homeowners, business entities, manufacturers and/or electricians may have access to the accounts and profiles stored in the database 118. Entities may gain access to the database 118 by way of the mobile device 110, the computing device 112 and/or the Internet 114. The accounts and profiles may be password-protected, so that only authorized users may gain access to the accounts and profiles stored in the database 118.

For example, a user may establish an account with database 118 provider (e.g., cloud data provider, manufacturer, or the like). Each such account may have permissions or roles assigned to the account. For example, a service technician may have a role of "technician" assigned to his account and may be associated with multiple panel system 102. As such, the user can access/manage/view or otherwise manipulate data in database 118 for the multiple panel systems 102. As another example, a homeowner may associate multiple properties with his account. Thus, the homeowner can access/manage/view or otherwise manipulate data in database 118 for the panel systems 102 associated with the homeowner's properties. In some examples, a user may be assigned a role with limited access privileges, such as, for example, privileges may be limited to viewing historical data and receiving alerts only but changing settings (e.g., alert settings, upgrade breaker firmware, etc.) may be denied. For example, a landlord may establish a profile for a tenant in which a tenant might access historical data and receive alerts but not make changes to the components of the panel system.

As another example, a commercial technicians or maintenance groups might have an account in which locations (e.g., multiple panels systems each with multiple branch locations) are accessible to the commercial groups account. In some examples, manufactures of the communication enabled circuit breakers and/or circuit breaker controller may establish a cloud account and may aggregate data from multiple cloud account (e.g., based on similar installed equipment, similar branch circuit types, similar loads, etc.). such aggregated data may be used by the manufacturer to improve services and/or devices as described herein, such as, for example, upgrading firmware for breakers, or the like.

Additionally, cloud account may establish alert settings (e.g., alert location (e.g., email, text, phone call, or the like). Alerts may be triggered based on the historical data (e.g., events, electrical parameters, breaker diagnostics, breaker cycling On/Off, or the like).

The database 118 may store historical data related to the panel 102 and particularly the communication enabled circuit breakers 104-1 to 104-10 deployed in panel 102. Such historical data can be based on data or information received from communication enabled circuit breakers 104-1 to 104-10, such as, for example, data including indications of operating conditions of the communication enabled circuit breakers 104-1 to 104-10. In general, the historical data may be used in deciding to: (1) update fault interrupter instructions associated with one or more communication enabled circuit breakers 104-1 to 104-10, (2) calibrate one or more communication enabled circuit breakers 104-1 to 104-10, (3) predict faults on branch circuits coupled to one or more wireless circuit breakers 104-1 to 104-10, (4) predict failure of loads coupled to branch circuits coupled to one or more wireless circuit breakers 104-1 to 104-10, etc. This is described in greater detail below when describing FIGS. 5-12. It is worth noting, that database 118 can be stored in the cloud (e.g., accessible via Internet 114), on remote entity 120, on controller 106, or stored local to communication enabled circuit breakers 104. For example, in some instances, each of communication enabled circuit breakers 104 may include a memory arranged to "log" or capture events, electrical parameters, or other metrics as detailed herein. Furthermore, the various logic flows and techniques detailed herein to "analyze" such historical data can be implemented by any of the remote devices (e.g., executed by a physical remote device such as a mobile phone, executed by a cloud computing provider, executed by the controller 106, or even executed local to the breaker 200). Examples are not limited in this context.

However, prior to describing these several example embodiments, a description of the system 100 and particularly components and operation of exemplary communication enabled circuit breakers 104 and an exemplary circuit breaker controller 106 of the system 100 is given. As described above, the present disclosure can be implemented to provide communication enabled circuit breakers 104, circuit breaker controller 106, and remote entities 120, arranged to communicate via either wired or wireless communication protocols and technologies. However, for clarity of presentation, the following examples depict and describe communication enabled circuit breakers 104 and a circuit breaker controller 106 arranged to communicate via wireless communication protocols. As such, many of the communication enabled circuit breakers 104 described in the following examples are referred to as "wireless circuit breakers" 104. Likewise, the circuit breaker controller 106 may be referred to as a "wireless circuit breaker controller" 106. This is not intended to be limiting and the example breakers, controller, remote entities, techniques, and systems depicted and described below can be implemented with wired communication technologies without departing from scope of the disclosure. Additionally, the wireless circuit breakers 104 and the wireless circuit breaker controller 106 are described herein to communicate via BLE for purposes of convenience and clarity of presentation. This is also not intended to be limiting.

With some implementations, access to database 118 can be facilitated and/or provided via a graphical user interface (GUI) or user interface (UI). Thus, a user can determine, via the GUI and/or UI a status of the communication enabled circuit breakers 104-1 to 104-10, initiate tripping or setting of the communication enabled circuit breakers 104-1 to 104-10, view a historical power consumption of the panel 102, each of the communication enabled circuit breaker 104-1 to 104-10, or the like.

The storage 116 may be a computer readable or machine-readable storage medium may include any tangible media capable of storing electronic data, including volatile memory or non-volatile memory, removable or non-removable memory, erasable or non-erasable memory, writeable or re-writeable memory, and so forth. The storage 116 may also include computer executable instructions. Examples of computer executable instructions may include any suitable type of code, such as source code, compiled code, interpreted code, executable code, static code, dynamic code, object-oriented code, visual code, and the like. The examples are not limited in this context. The storage 116 may be one or more memory chips capable of storing data and allowing any storage location to be directly accessed by a processor linked to the storage 116, such as any type or variant of Static random-access memory (SRAM), Dynamic random access memory (DRAM), Ferroelectric RAM (FRAM), NAND Flash, NOR Flash and Solid State Drives (SSD). The database 118 may be stored in the one or more memory chips.

System 100 may further include auxiliary sensors 130, which may be disposed within circuit breaker panel 102 or external to circuit breaker panel 102. For example, system 100 is depicted including auxiliary sensors 130-1 and 130-2 disposed within panel 102 and auxiliary sensors 130-3 and 130-4 disposed external to panel 102. Auxiliary sensor 130 can communicatively couple to circuit breaker controller 106 via any of the wired or wireless communication schemes discussed herein. In general, auxiliary sensors 130 can be any sensor, such as, for example, a temperature sensor, a humidity sensor, a light sensor, a proximity sensor, a motion sensor, etc. Furthermore, auxiliary sensors 130 may correspond to Internet-of-Things (IoT) type devices or other "smart" systems. For example, an alarm system might be coupled to controller 106 and arranged to provide controller 106 with indications (e.g., via motion sensors, smart door locks, etc.) of the environment in which the system 100 is deployed. As another example, auxiliary sensor could be a GPS sensor coupled to a mobile device. The GPS sensor could provide location input to the controller 106 such that controller 106 may implement various features detailed herein based on such location input, often referred to as "geo-fencing". As another example, auxiliary sensor 130 could be a smart thermostat coupled to an HVAC system. The smart thermostat may provide an input to controller 106 and controller 106 may actuate (e.g., turn OFF, turn ON) a breaker associated with the branch circuit that feeds the HVAC system. Examples are not limited in these contexts.

It is noted that the present disclosure may be implemented with a combination of conventional circuit breakers and communication enabled circuit breakers as described herein. Thus, for example, a conventional panel might be upgraded where conventional circuit breakers for one or more branch circuits are replaced with communication enabled circuit breakers as detailed herein.

Figure 2:
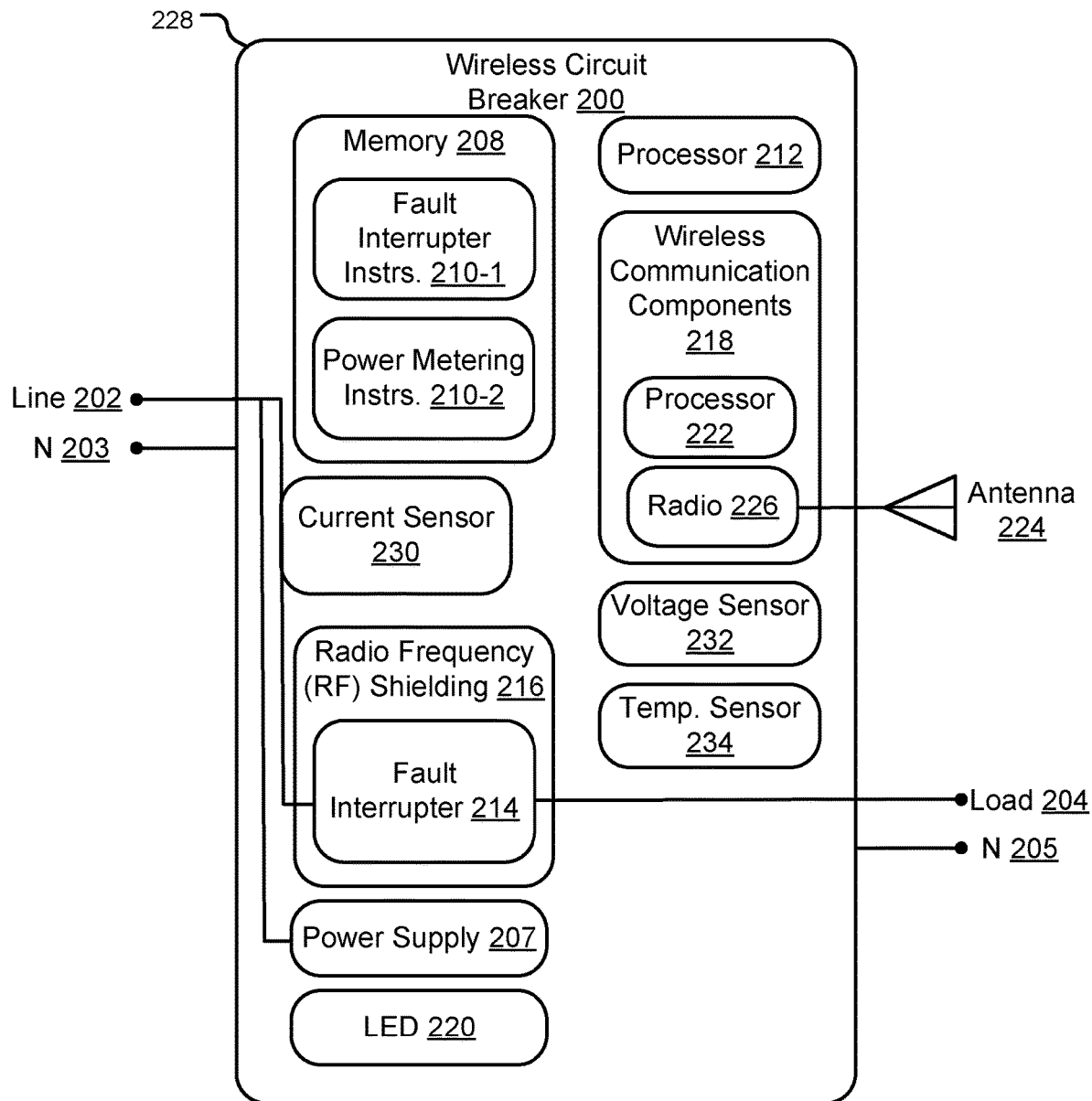
FIG. 2 illustrates a first exemplary embodiment of a communication enabled circuit breaker.
Figure 3:
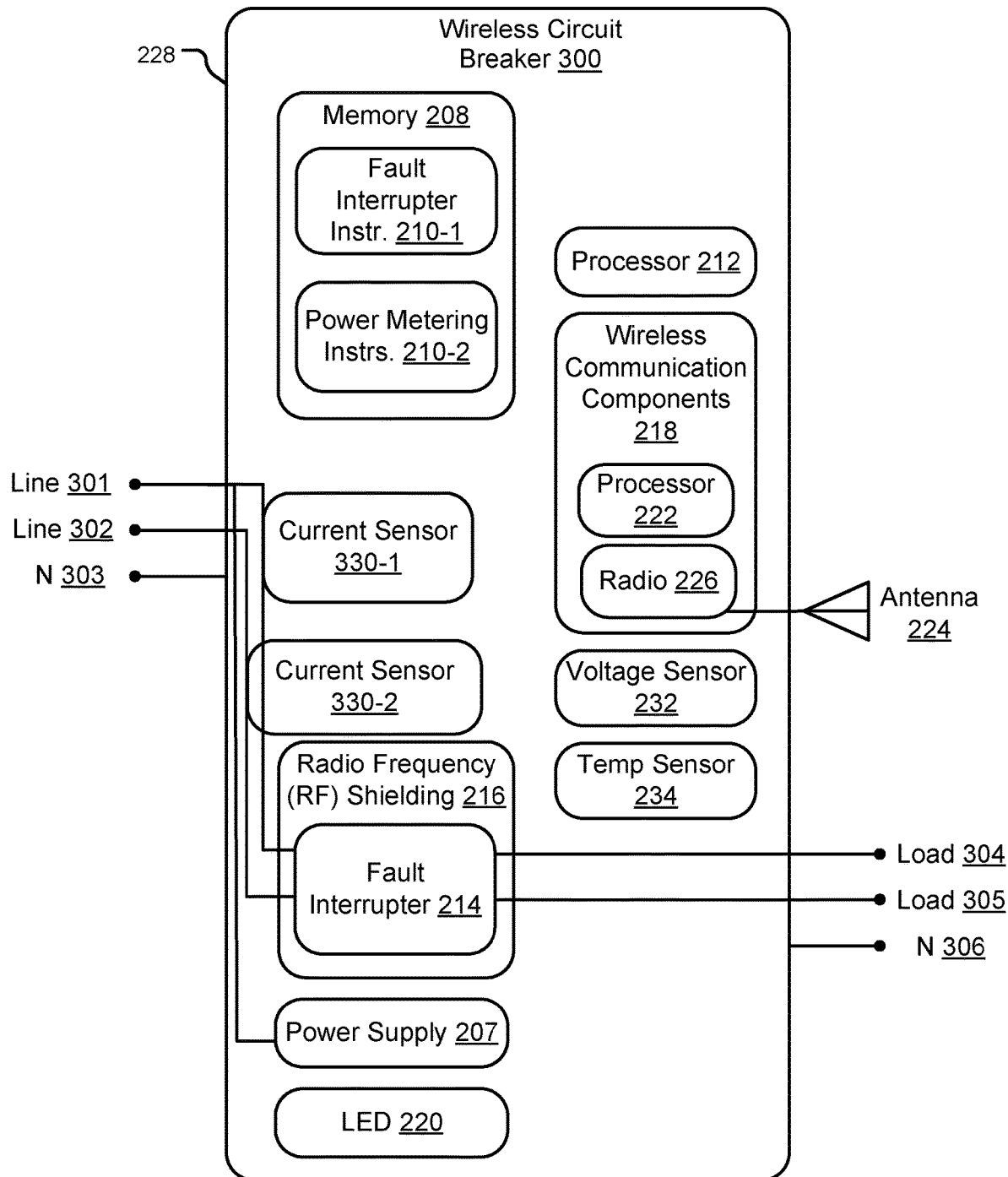
FIG. 3 illustrates a second exemplary embodiment of a communication enabled circuit breaker.
Figure 4:
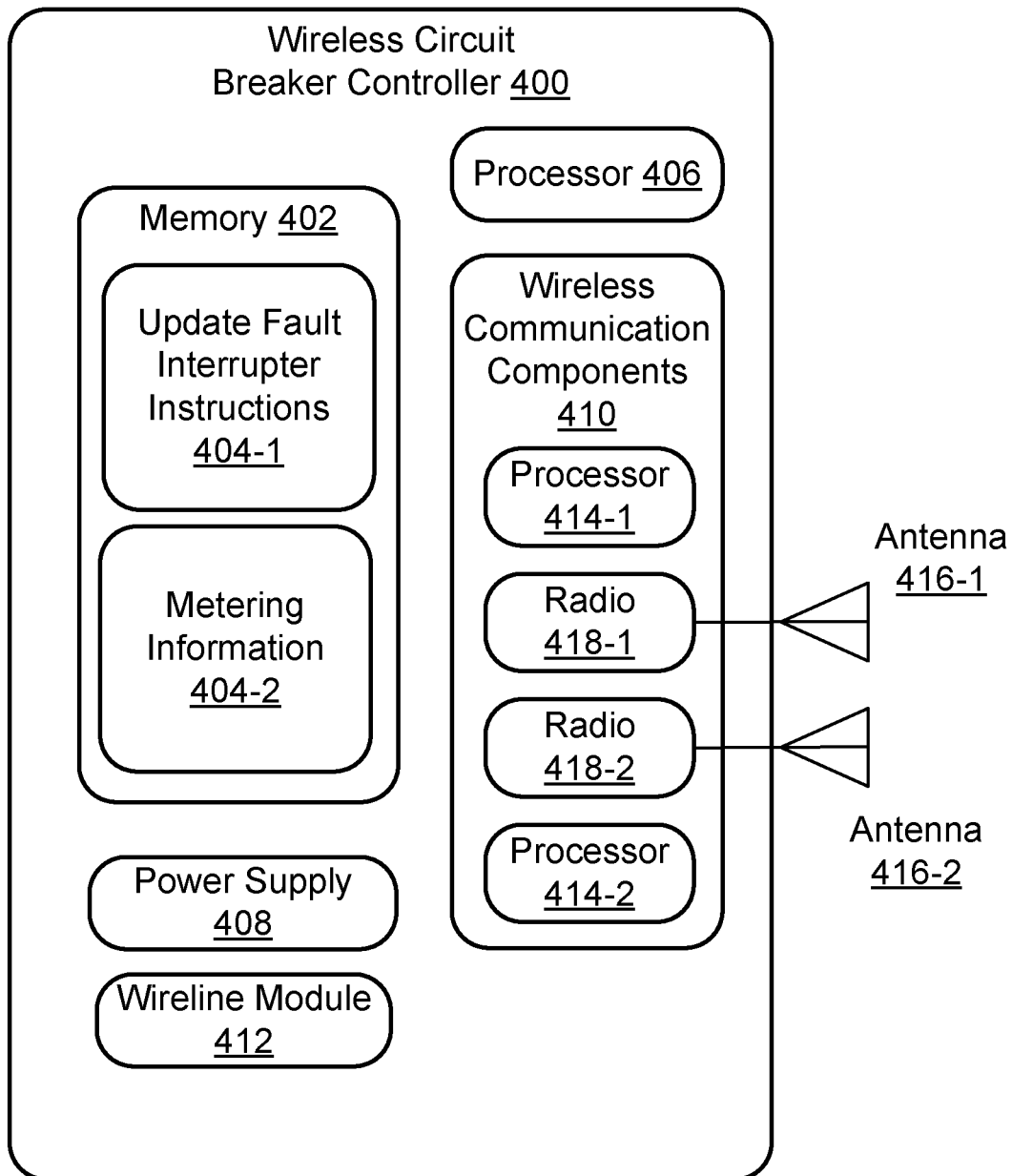
FIG. 4 illustrates a communication enabled circuit breaker controller in accordance with an exemplary embodiment.

FIGS. 2-4 illustrate example embodiments of wireless circuit breakers and a wireless circuit breaker controller. FIGS. 5-12 illustrate example and techniques that can be implemented by the example breakers and controller. The example breakers and controller, along with components included in these example embodiments, are first described followed by the description of the example techniques.

FIG. 2 illustrates a wireless circuit breaker 200 in accordance with an exemplary embodiment. In some examples, the wireless circuit breaker 200 can be implemented as any one of the communication enabled circuit breakers 104-1 to 104-10 of the system 100 of FIG. 1. Generally, the wireless circuit breaker 200 may be used in a wide range of commercial, residential, and industrial circuit breaker panels. The wireless circuit breaker 200 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480.

The wireless circuit breaker 200 includes multiple connections or "terminals." Specifically, wireless circuit breaker 200 is depicted including a line side phase connection 202, a line side neutral connection 203, a load side phase connection 204, and a load side neutral connection 205. The line side phase connection 202 and line side neutral connection 203 are coupled to a power source. The load side power phase connection 204 and load side neutral connection 205 are coupled to a load. Thus, current can enter the wireless circuit breaker 200 via the line side phase connection 202, exit the wireless circuit breaker 200 via the load side phase connection 204, return to the wireless circuit breaker 200 via load side neutral connection 205, and travel back to the power source via line side neutral connection 203. The line side phase connection 202 and neutral connection 203 may be coupled to a power source (e.g., an electrical grid). The load side phase connection 204 and the load side neutral connection 205 may be coupled to a branch circuit that may feed a load (e.g., HVAC system, refrigerator, TV, etc.).

The wireless circuit breaker 200 may include a power supply 207. The power supply 207 receives an input power from the line side phase connection 202 and the line side neutral connection 203. The power supply 207 converts, in some implementations, an AC voltage to a regulated DC voltage for use by some or all the electrical components associated with the wireless circuit breaker 200. To that end, the voltage provided by the power supply 207 is uninterrupted even when the wireless circuit breaker 200 is caused to trip because of a trip incident. In some examples, the power supply 207 includes circuitry to condition the current and/or voltage supplied to the electrical components of the wireless circuit breaker 200. In some examples, power supply 207 includes a fuse, which can in some embodiments be replaceable, to protect the power supply 207 and wireless circuit breaker 200 from overcurrent conditions. In some examples, the power supply 207 itself includes a circuit breaker to protect the power supply 207 and wireless circuit breaker 200 from overcurrent conditions. In some examples, power supply 207 itself includes a circuit breaker to protect the power supply 207 and wireless circuit breaker 200 from overcurrent conditions. With some examples, power supply 207 can be arranged to compensate for various electrical conditions that may be present on the input line for the panel system 102. For example, power supply 207 could be arranged to compensate for under-voltage conditions, filter interference, or the like.

A memory 208 is disposed in the wireless circuit breaker 200. The memory 208 may comprise an article of manufacture. In some examples, the memory 208 may include any non-transitory computer readable medium or machine readable medium, such as an optical, magnetic or semiconductor storage. The memory 208 may store various types of computer executable instructions 210. The memory 208 may be coupled to a processor 212. The processor 212 could be any of a variety of processors, such as, for example, a central processing unit, a microprocessor, a field programmable gate array, an application specific integrated circuit, or the like. The processor 212 can be arranged to execute instructions 210 to aid in performing one or more techniques described herein.

In some implementations, the memory 208 is configured to store fault interrupter instructions 210-1. The processor 212 can be arranged to execute fault interrupter instructions 210-1 to aid in performing one or more techniques described herein (e.g., cause the wireless circuit breaker 200 to trip, cause the wireless circuit breaker 200 to set, wirelessly transmit data related to a trip incident (e.g., a signature of a detected fault) to a remote entity 120, or the like). Additionally, the memory 208 is configured to store power metering instructions 210-2. The processor 212 can be arranged to execute power metering instructions 210-2 to aid in performing one or more techniques described herein, such as, cause the wireless circuit breaker 200 to collect operating metrics (e.g., current measurements, voltage measurements, power measurements, or the like) and send the collected operating metrics to a remote entity 120 (e.g., directly or via controller 106, or the like).

In some examples, the wireless circuit breaker 200 could be provisioned with more than one set of fault interrupter instructions 210-1. For example, memory 208 could store different sets (or types) of fault interrupter instructions 210-1 while processor 212 could be arranged to execute a selected one of the sets of fault interrupter instructions 210-1 depending upon certain condition(s), e.g., whether the building in which the panel is coupled is occupied, whether the building in which the panel is coupled is under constructions, a time of day, a time of year, a geographic location of the panel, or the like.

The wireless circuit breaker 200 includes a fault interrupter 214 or a "circuit interrupter" 214. In some implementations, the fault interrupter 214 is operable to interrupt faults (e.g., decouple the load side phase connection 204 from the line side phase connection 202) based in part on the fault interrupter instructions 210 stored in the memory 208. As used herein, the term "fault" could include any of a variety of conditions with which it may be desirable for the wireless circuit breaker 200 to disconnect the line side connection from the load side connection. For example, "fault" may be a fault within the breaker, a fault on the load side, a fault on the line side, or the like. As another example, "fault" may be a ground fault, an arc fault, an overcurrent fault, or the like. Examples are not limited in these contexts. The fault interrupter 214 may comprise various hardware elements. In some examples, the fault interrupter 214 includes at least a trip solenoid and/or an energy storage element to trip the trip solenoid and cause the line side connection 202 to decouple from load side connection 204. In further examples, the fault interrupter 214 can include a reset solenoid and/or energy storage element to set the breaker 200 and cause the line side connection 202 to couple to the load side connection 204.

The fault interrupter instructions 210 may be executed (e.g., by fault interrupter 214, by processor 212, or the like) to cause the trip solenoid to break current flowing from the line side phase connection 202 to the load side phase connection 204 in specific conditions or to cause the trip solenoid to restore current flowing from the line side phase connection 202 to the load side phase connection 204 in specific conditions. For example, when the current exceeds a threshold defined by the fault interrupter instructions 210. In another example, the fault interrupter 214 includes functionality, controllable by way of the fault interrupter instructions 210, to sense characteristics of a line current, for example an amount of current, a frequency of the current, high-frequency current components, dynamic distribution of the frequency components over time and within a half cycle of a power line frequency, various profiles of power line characteristics, etc. As another example, the fault interrupter 214 includes functionality, controllable by way of the fault interrupter instructions 210, to set the breaker 200, such as, upon receipt of a control signal from a remote entity 120 where the control signal includes an indication to set the breaker.

The fault interrupter 214 may be sensitive to radio frequency (RF) signals (i.e., wireless signals). Therefore, the fault interrupter 214 may be partially or completely surrounded by an RF shielding 216. The RF shielding 216 may comprise any suitable material such as ferrous material, to attenuate wireless signals. In some implementations, the RF shielding 216 shields the fault interrupter 214 from wireless signals generated by the: wireless circuit breaker 200, other wireless circuit breakers 200, wireless circuit breaker controller 106, and/or entities external of the circuit breaker panel 102.

The wireless circuit breaker 200 includes wireless communication components 218. The wireless communication components 218 enable the wireless circuit breaker 200 to communicate wirelessly using any suitable type of wireless communication technology, such as that described herein. The wireless communication components 218 may include at least a radio 226, an antenna 224, and processor 222. In general, the radio 226 can be any radio configured to communicate using a wireless transmission scheme, such as, for example, BLE. The antenna 224 can be coupled to the radio 226 and configured to emit and receive RF signals. For example, the antenna 224 can emit RF signals received from the radio 226 (or radio transceiver circuitry, which is not depicted for clarity) coupled between the radio 226 and the antenna 224. The antenna 224 could be any of a variety of antennas (or antenna arrays) having different shapes and/or configurations arranged to emit/receive RF signals on a frequency, range of frequencies, or the like. Furthermore, the antenna 224 could be internal to the housing 228 of the wireless circuit breaker 200 or external to the housing 228 or packing of the breaker 200. The processor 222 can be any of a variety of processors (e.g., application processor, baseband processors, etc.) arranged to perform at least transmission and reception of wireless signals associated with the wireless circuit breaker 200.

As described, the wireless communication components 218 receives power from the power supply 207, which is coupled to the line side phase connection. Therefore, the wireless communication components 218 enable the wireless circuit breaker 200 to communicate wirelessly even if the fault interrupter 214 interrupts current flowing between the line side phase connection 202 and the load side phase connection 204. Additionally, this provides an advantage over conventional circuit breakers that might include some diagnostic capabilities. For example, conventional circuit breakers diagnostic features are load side powered. As such, a user must manually return a breaker to the ON position to retrieve any diagnostic information with conventional breakers. However, with breakers according to the present disclosure, the diagnostic components are powered from the line side. As such, a user may retrieve diagnostic information even where a breaker has tripped.

An indicator may be implemented on the wireless circuit breaker 200. The indicator may be any suitable type of indicator such as a visual or audible indicator including but not limited to, an LED, neon bulb, and/or piezoelectric buzzer. In the present embodiment, the indicator is a light emitting diode (LED) 220. The LED 220 may be illuminated to a predefined color, illumination pattern, and/or illumination frequency, when the wireless circuit breaker 200 is in an update mode. The update mode indicates that the wireless circuit breaker 200 is ready to receive updated fault interrupter instructions for storage in the memory 208 from a remote entity 120. In some implementations, when the wireless circuit breaker 200 is an update mode, the wireless circuit breaker 200 is open or tripped. In some implementations, when the wireless circuit breaker 200 is an update mode, the wireless circuit breaker 200 is unable to provide tripping functionality. This is described in greater detail below.

The wireless circuit breaker 200 may comprises a housing 228. The housing 228 may be a miniature circuit breaker (MCB) housing. In some implementations, the MCB housing has a width of 1 inch. It is noted that the dimensions of the breakers are given for example only. Breaker widths could be any width, e.g., ½ inch, ¾ inch, 1 inch, 1½ inches, 2 inches, or the like.

In some implementations, the wireless circuit breaker 200 includes a current sensor 230. In general, the current sensor 230 provides a signal that is proportional to current flowing in either the line side phase connection 202 or the load side phase connection 204. The signal generated by the current sensor 230 may be provided to the processor 212. In some implementations, the wireless circuit breaker 200 may also include a voltage sensor 232. The voltage sensor 232 can be coupled to line side phase connection 202 or the load side phase connection 204 and configured to measure a voltage applied to the line side phase connection 202 or the load side phase connection 204. The voltage sensor 232 may provide a signal representing a voltage on the line side phase connection 202 or the load side phase connection 204. The signal representing the voltage on the line side phase connection 202 or the load side phase connection 204 may be provided to the processor 212. In some implementations, the wireless circuit breaker 200 may also include a temperature sensor 234. The temperature sensor 234 may be arranged to sense an ambient air temperature proximate to the current sensor 230. Furthermore, the temperature sensor 234 may be arranged to sense a temperature of the ambient air within the housing 228. Furthermore, the temperature sensor 234 may be a combination temperature and humidity sensor arranged to further sense a humidity level within the housing 228. The temperature sensor 234 may convert the sensed temperatures and/or humidity levels to one or more signals that may be provided to the processor 212.

As described, the processor 212 can be arranged to execute power metering instructions 210-1 to aid in performing one or more techniques described herein. For example, the processor 212 can cause the wireless circuit breaker 200 to collect signals indicative of current between the line side phase connection 202 and the load side phase connection 204. Additionally, the processor 212 can cause the wireless circuit breaker 200 to collect signals indicative of current and a voltage on the line side phase connection 202. Additionally, the processor 212 can cause the wireless circuit breaker 200 to obtain and/or calculate metering information based on the sensed current, sensed voltage, or both). Those collected current or current and voltage signals may be provided by the current sensor 230 and the voltage sensor 232, respectively. Furthermore, the processor 212 can cause the wireless circuit breaker 200 to condition the obtained or calculated metering information based on temperature and or/humidity signals obtained by the temperature sensor 234. The obtained and/or calculated metering information may include line voltage, mains frequency, phase current and/or voltage of a multiphase system, and/or power consumption. Furthermore, obtained and/or calculated metering information may include current, voltage, root mean square (RMS) current, RMS voltage, power, reactive power, active power, reactive energy, active energy, power quality, energy consumption, energy feedback to power grid, etc. With some examples, processor 212 can determine metering information at a rate of between 4 and 8 kilo Hertz (kHz).

The obtained metering information may be conveyed to the wireless circuit breaker controller 106 by way of the circuit breaker 200. As detailed, as power supply 207 may operate from the line side of breaker 200, metering information may be obtained and/or conveyed by breaker 200 even when the fault interrupter is in the tripped state. The wireless circuit breaker controller 106 may relay the obtained metering information to a remote entity 120. The obtained metering information may be stored database 118 stored on storage 116. The wireless circuit breaker controller 106, remote entity 120, and/or the wireless circuit breaker 104 may obtain the metering information using one or more calculations that use current, or voltage and current samples obtained from the line side phase connection 202 or the load side phase connection 204. Furthermore, the wireless circuit breaker controller 106, remote entity 120 and/or the wireless circuit breaker 104 may store the metering information to establish historical data that relates to the metering information and/or diagnostic information. In some examples, the historical data can be stored in database 118.

FIG. 3 illustrates a wireless circuit breaker 300 in accordance with another exemplary embodiment. In some examples, the wireless circuit breaker 300 can be implemented as any one of the communication enabled circuit breakers 104-1 to 104-1 of the system 100 of FIG. 1. Generally, the wireless circuit breaker 300 may be used in a wide range of commercial, residential, and industrial circuit breaker panels. The wireless circuit breaker 300 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480. It is noted, wireless circuit breaker 300 includes several similar components to wireless circuit breaker 200, such as memory 208 including fault interrupter instructions 210-1 and power metering instructions 210-2; processor 212, power supply 207, LED 220; and wireless communications components 218 including processor 222 antenna 224 and radio 226. Such similar components are numbered consistently between FIGS. 2-3. Furthermore, a description of such components is not repeated when describing breaker 300 for purposes of brevity.

The wireless circuit breaker 300 includes line side phase connections 301 and 302, a line side neutral connection 303, load side phase connections 304 and 305, and a load side neutral connection 306. The line side phase connections 301 and 302 and the line side neutral connection 303 are coupled to a power source. The load side phase connections 304 and 305 and the load side neutral connection 306 are coupled to a load. Thus, current can enter the wireless circuit breaker 300 via the line side phase connections 301 and 302, exit the wireless circuit breaker 300 via the load side phase connections 304 and 305, and return to the wireless circuit breaker 300 via the load side neutral connection 306, and travel back to the power source via the line side neutral connection 303. The line side phase connections 301 and 302 and the line side neutral connection 303 may be coupled to a power source (e.g., an electrical grid). The load side phase connections 304 and 305 and the load side neutral connection 306 may be coupled to a load (e.g., HVAC system, refrigerator, TV, etc.).

The power supply 207 receives an input power from one or more of line side phase connections 301 and 302 and the line side neutral connection 303. The power supply 207 converts, in some implementations, an AC voltage to a regulated DC voltage for use by some or all the electrical components associated with the wireless circuit breaker 300.

In some implementations, the wireless circuit breaker 300 includes current sensors 330-1 and 330-2. As depicted, current sensor 330-1 is coupled to line side phase connection 301 while current sensor 330-2 is coupled to line side phase connection 302. In general, the current sensors 330-1 and 330-2 provide signals that are proportional to a derivative of a current flowing in the respective line side phase connections 301 and 302. The signals generated by the current sensors 330-1 and 330-2 may be provided to the processor 212.

As described, the processor 212 can be arranged to execute power metering instructions 210-2 to aid in performing one or more techniques described herein. For example, the processor 212 can cause the wireless circuit breaker 300 to collect current signals indicative of current between the line side phase connections 301 and 302 and the load side phase connections 304, and 305. Additionally, the processor 212 can cause the wireless circuit breaker 300 to collect signals indicative of current and voltage on the line side phase connection 301 and 302. Additionally, the processor 212 can cause the wireless circuit breaker 300 to obtain and/or calculate metering information based on sensed current, sensed voltage, or both sensed current and voltage. Those collected current or current and voltage signals may be provided by the current sensors 330-1 and/or 330-2 and the voltage sensor 232. Furthermore, the processor 212 can cause obtained or calculated metering information to be conditioned based on temperature and or/humidity signals obtained by the temperature sensor 234. The obtained and/or calculated metering information may include line voltage, mains frequency, line voltage, phase current, and/or power consumption. Furthermore, obtained and/or calculated metering information may include current, voltage, root mean square (RMS) current, RMS voltage, power, reactive power, active power, reactive energy, active energy, etc. The obtained metering information may be conveyed to the wireless circuit breaker controller 106 by way of the circuit breaker 300. The wireless circuit breaker controller 106 may relay the obtained metering information to a remote entity 120. The wireless circuit breaker controller 106, remote entity 120, and/or the wireless circuit breaker 300 may obtain the metering information using one or more calculations that use voltage and current samples obtained from the line side phase connections 301 and 302. Furthermore, the wireless circuit breaker controller 106, remote entity 120, and/or the wireless circuit breaker 300 may store the metering information to establish historical data that relates to the metering information. The historical data and other data may be stored in the database 118.

FIG. 4 illustrates a wireless circuit breaker controller 400 in accordance with an exemplary embodiment. In some examples, the wireless circuit breaker controller 400 can be implemented as the circuit breaker controller 106 of the system 100 of FIG. 1. Generally, the wireless circuit breaker controller 400 may be used in a wide range of commercial, residential, and industrial power panels. In some embodiments, the wireless circuit breaker controller 400 can be implemented within a circuit breaker panel (e.g., panel 102) while in other embodiments, the wireless circuit breaker controller 400 can be implemented externally to a panel (e.g., panel 102) and coupled to wireless breakers (e.g., breakers 104-n) within the panel. In an alternative implementation, the wireless circuit breaker controller 400 can be implemented as part of a mobile device, such as a mobile phone, having hardware/software functionality to enable the mobile device to function as the described wireless circuit breaker controller 400.

A memory 402 is disposed in the wireless circuit breaker controller 400. The memory 402 is configured to store updated fault interrupter instructions 404-1. Furthermore, the memory 402 may be configured to store metering information 404-2 received from one or more wireless circuit breakers (e.g., breakers 104-n). The stored metering information 404-2 may form the basis of historical information or data associated with individual wireless circuit breakers. As detailed further herein, such historical information may be stored in database 118. The memory 402 may comprise an article of manufacture. In some examples, the memory 402 may include any non-transitory computer readable medium or machine readable medium, such as an optical, magnetic or semiconductor storage. The memory 402 may store various types of computable executable instructions, such as the updated fault interrupter instructions 402.

The memory 402 may be coupled to a processor 406. Processor 406 could be any of a variety of processors, such as, for example, a central processing unit, a microprocessor, a field programmable gate array, an application specific integrated circuit, or the like. Processor 406 can be arranged to execute instructions stored in the memory 402 to aid in performing one or more techniques described herein.

The wireless circuit breaker controller 400 may include a power supply 408. The power supply 408 is to convert, in some implementations, an AC voltage to a regulated DC voltage for use by some or all the electrical components associated with the wireless circuit breaker controller 400. With some examples, power supply 408 can include multiple "hot" terminals and a neutral terminal. Thus, power supply 408 could receive power from either "hot" wire to provide redundancy. In the case of multi-phase systems, the power supply 408 could be arranged to couple to multiple phases to provide redundancy for the loss of one of phases.

The wireless circuit breaker controller 400 includes wireless communication components 410. The wireless communication components 410 enable the wireless circuit breaker controller 400 to communicate wirelessly using any suitable type of wireless communication technology (e.g., a short-range wireless/near field wireless technology, Bluetooth®, Wi-Fi®, ZigBee®, etc.) Therefore, the wireless communication components 410 may include at least radio 418-1, antenna 416-1, and processor 414-1. In general, the radio 418-1 can be any radio configured to communicate using a wireless transmission scheme, such as, for example, BLE. The antenna 416-1 can be coupled to radio 418-1 and configured to emit and receive RF signals. For example, the antenna 416-1 can emit RF signals received from the radio 418-1 (or a radio front, which is not depicted for clarity) coupled between the radio 418-1 and the antenna 416-1. The antenna 416-1 could be any of a variety of antennas (or antenna arrays) having different shapes and/or configurations arranged to emit/receive radio waves on a particular frequency, range of frequencies, or the like. Processor 414-1 can be any of a variety of processors (e.g., application processor, baseband processors, etc.) arranged to perform at least transmission and reception of wireless signals associated with the wireless circuit breaker controller 400. Furthermore, the antenna 416-1 could be internal to the physical housing or packaging of the breaker controller 400 or external to the physical housing or packing of the breaker controller 400.

As detailed, some embodiments provide wireless communication components 410 of wireless circuit breaker controller 400 are operable to communicate over several wireless frequencies or schemes. As such, processor 414-1, radio 418-1 and antenna 416-1 could be arranged to communicate over multiple wireless communication technologies, such as, for example, BLE and Wi-Fi. In other examples, wireless communication components 410 can include multiple sets of processor, radio and antenna. For example, as depicted, components 410 further include radio 418-2, antenna 416-2 and processor 414-2. Thus, the first set of radio 418-1, antenna 416-1 and processor 414-1 can be arranged to communicate using a first wireless communication scheme, such as, BLE while the second set of radio 418-2, antenna 416-2 and processor 414-2 can be arranged to communicate using a second wireless communication scheme, such as, Wi-Fi.

The wireless circuit breaker controller 400 may further include a wireline network interface 412. The wireline network interface 412 enables the wireless circuit breaker controller 400 to be coupled via a wireline connection to various devices. For example, in some implementations, the wireless circuit breaker controller 400 is a standalone device that may be wireline connected (e.g., via Ethernet) to a remote device (e.g., Internet cloud 114) and wirelessly connected to wireless breakers (e.g., breakers 104-n) within a circuit breaker panel (e.g., panel 102). In such an example, the controller 400 could optionally omit one of the wireless communication components (e.g., wireless communication components 410 arranged to communicate via Wi-Fi, or the like). As another example, the wireless circuit breaker controller 400 could be wireless coupled to wireless circuit breakers (e.g., wireless circuit breaker 200, or the like) via wireless communication components 410 and coupled via a wired communication connection to other communication enabled circuit breakers (not shown) via wireline network interface 412.

FIGS. 5-12 illustrate logic flows, implementable by a communication enabled circuit breaker and panel system, such as, the system 100 of FIG. 1. In general, these logic flows can be implemented by any communication enabled circuit breaker and panel system or component(s) of such a system, such as, the system 100, communication enabled circuit breakers 104-n, circuit breaker controller 106, remote entity 120, communication enabled circuit breaker 200, communication enabled circuit breaker 300, circuit breaker controller 400, and/or the like. The following description of FIGS. 5-12 reference remote entity 120, controller 400 and breaker 200 for purposes of convenience and clarity only. However, it is to be understood that the logic flows described could be implemented by different combinations of components of a communication enabled circuit breaker and panel system without departing from the spirit and scope of the claimed subject matter.

Figure 5:
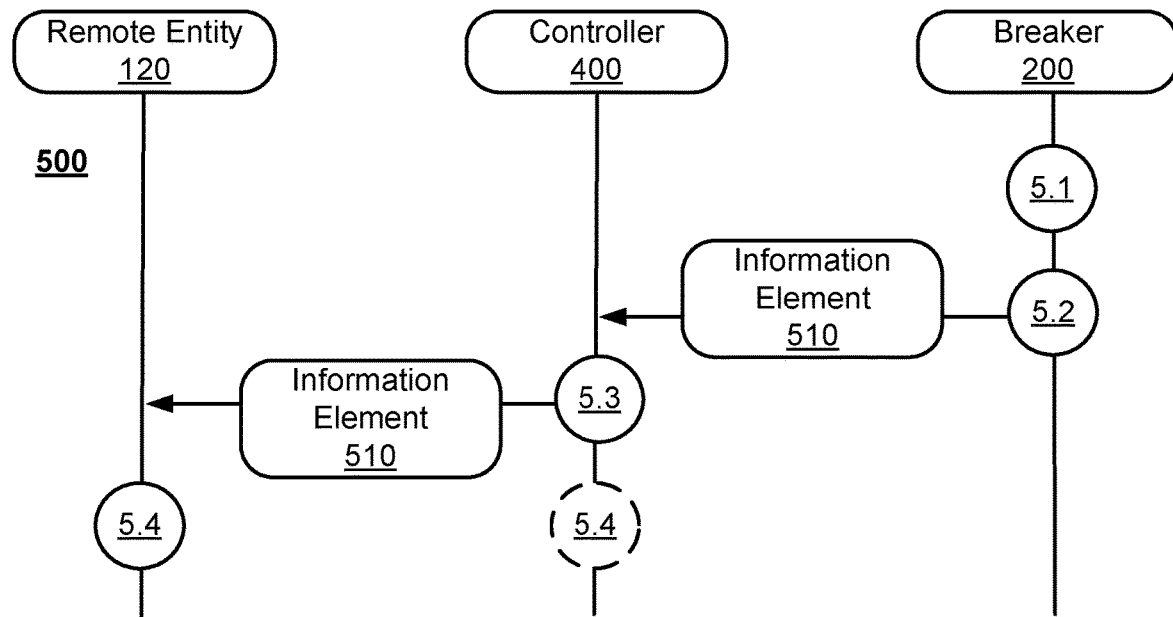
FIG. 5 illustrates a first exemplary embodiment of a technique to communicate with a communication enabled circuit breaker.

FIG. 5 depicts a technique 500 to communicate with a communication enabled circuit breaker. The technique 500 may start at circle 5.1. At circle 5.1, breaker 200 may record operating conditions or events related to the breaker 200. For example, at circle 5.1 the breaker 200 may record metering information or electrical parameters (e.g., energy, voltage, current, power factor, active power factor, reactive power factor, power loss, voltage sags, power consumption, or the like) associated with the breaker 200. As another example, at circle 5.1 the breaker 200 may record other operating conditions (e.g., temperature, humidity, time, date, or the like) associated with the breaker 200 (e.g., from auxiliary sensors 130, or the like).

In some examples, at circle 5.1 the breaker 200 may record occurrence of a fault event on load line 204. The recorded occurrence of the fault can include an indication of a signature associated with the detected fault. With some examples, at circle 5.1 the breaker 200 may record a status of the fault interrupter 214 of breaker 200, such as, whether the fault interrupter is in the open state (e.g., tripped) or in the closed state (e.g., set), whether breaker 200 was tripped or set locally or remotely, an indication or version number of the fault interrupter instructions 210-1, or the like. In some examples, information element 510 can include indications of a unique identifier of the breaker 200 (e.g., a unique wireless circuit breaker serial number, or the like), a time and date of the trip incident, a load signature that caused the trip incident, a zone or area that is without power because of the trip incident, or the like. With some examples, the information element 510 can include indications of current, voltage noise, differential current and voltage, and/or other monitored parameters observed proximate to the trip incident (e.g., prior to, within a specified time of, or the like).

Continuing to circle 5.2, breaker 200 can send information element 510 including indications of the recorded operating condition or events to controller 400. For example, breaker 200 can send information element 510 including indications of metering information, detected faults, breaker status, or the like to controller 400. With some examples, breaker 200 can send information element 510 to controller 400 via BLE. In some examples, breaker 200 can send information element 510 to controller 400 in response to being polled by controller 400 for information element 510. In other examples, breaker 200 can send information element 510 to controller 400 without first being polled by controller 400.

Continuing to circle 5.3, controller 400 can send information element 510 to remote entity 120. Said differently at circle 5.3 controller 400 can relay information element 510 from breaker 200 to remote entity 120. Continuing to circle 5.4, remote entity 120 can add indications of the operating conditions or events indicated in the information element 510 to a database, such as, database 118. For example, remote entity 120 can add an indication of metering information to database 118. As another example, remote entity 120 can add an indication of a detected fault to database 118. Thus, remote entity 120 can populate database 118 to provide a historical record of operating conditions of events (e.g., detected faults, or the like) associated with breaker 200, or more specifically, associated with a branch circuit coupled to load line 204 of breaker 200.

In further examples, remote entity 120 can send an alert to a responsible entity associated with breaker 200. For example, remote entity 120 can send an alert (e.g., email, text message, automated phone call, or the like) to a responsible entity (e.g., owner, operator, maintainer, or the like) of panel in which breaker 200 is deployed. With some examples, remote entity 120 can send such an alert in response to a trigger from a user profile or user account setting indicated in database 118 or storage 116. In some example, a trigger indicating an alert should be sent based on receipt of an information element indicating detection of a fault could be provided in database 118 or storage 116. As such, during operation, remote entity 120 can send an alert indicating detection of a fault by breaker 200 based on receipt of information element 510 indicating the detection of the fault. As another example, a trigger indicating an alert should be sent based on receipt of an information element indicating current flow exceeding a set limit could be provided in database 118 or storage 116. As such, during operation, remote entity 120 can send an alert indicating current flow exceeded the set limit based on receipt of information element 510 indicating a current flow that exceeds the set limit.

With some examples, the remote entity 120 might be a provider of the power for panel system including breaker 200 and controller 400. In such an example, at circle 5.3, controller 400 can send information element 510 including electrical parameters from breaker 200, diagnostic information for breaker 200, demand response for branch circuit coupled to breaker 200, brownout detection metrics, weather related metrics, and/or etc. to the power provider. With some examples, the controller can be arranged to provide indications of power fed back into the grid (e.g., in the case of solar power installation, or the like). It is noted that such interfacing with the "power company" might be facilitated on the branch level as opposed to merely providing metrics for the entire deployment. For example, power companies might have visibility into HVAC system usage during, solar power grid return, which can be filtered based on time, locations, weather, etc. as detailed herein.

Figure 6:
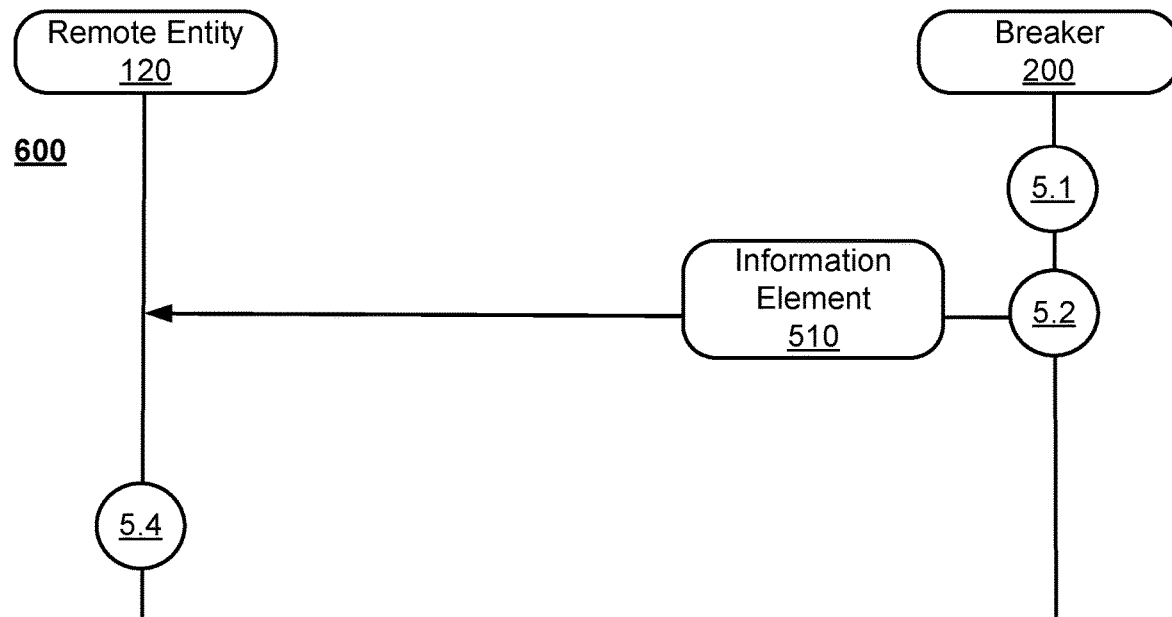
FIG. 6 illustrates a second exemplary embodiment of a technique to communicate with a communication enabled circuit breaker.

As noted herein, with some examples database 118 can be provided by controller 400. As such, technique 500 could omit circle 5.3 and controller 400 could implement circle 5.4 as depicted. Examples are not limited in these contexts. With some examples, remote entity 120 can directly connect to breaker 200. For example, FIG. 6 depicts technique 600 to communicate with a wireless circuit breaker. The technique 600 may include circles 5.1, 5.2 and 5.4 of technique 500 of FIG. 5. However, as illustrated, at circle 5.2 breaker 200 may send information element 510 directly to remote entity 120, as opposed to relaying information element 510 through controller 400.

Figure 7:
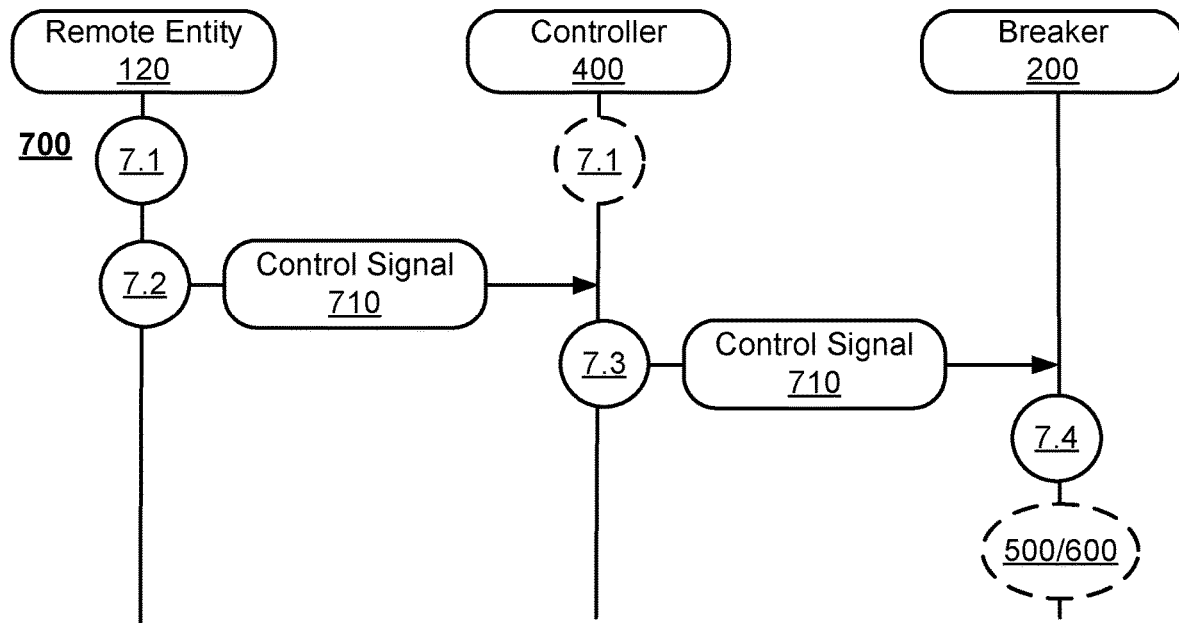
FIG. 7 illustrates a third exemplary embodiment of a technique to communicate with a communication enabled circuit breaker.

FIG. 7 depicts a technique 700 to communicate with a wireless circuit breaker. The technique 700 may start at circle 7.1. At circle 7.1, remote entity 120 can generate a control signal 710 comprising an indication of an action for breaker 200. For example, remote entity 120 can generate control signal 710 comprising an indication to report a status of breaker 200 to remote entity 120. As another example, remote entity 120 can generate control signal 710 comprising an indication to trip breaker 200 (e.g., interrupt current flow to load line 204). In another example, remote entity 120 can generate control signal 710 comprising an indication to set breaker 200 (e.g., restore current flow to load line 204). As another example, control signal 710 can comprise an indication to perform a self-test on breaker 200 and report the results (e.g., AFCI functionality, BLE connectivity, contact welding, RF interference levels, or the like) to either the remote entity 120 or the controller 400.

With some examples, the control signal 710 may include indications to adjust trip parameters, manage metering, cause the performance of diagnostics, enable retrieval of circuit breaker manufacturing and identification information, set calibration parameters, and/or enable soft and hard resets. In some examples, the control signal 710 may include indications to reset to a normal operating mode (e.g., reengage line monitoring), enable/disable arc fault functionality, enable/disable ground fault functionality, adjust trip response time, adjust a current threshold to cause a trip event, or the like. With some examples, the control signal can include indications to implement seasonal control of breaker 200, to implement time-based control of breaker 200, or to modify breaker 200 to comply with energy consumption regulation (e.g., Title 24 in California, or the like).

Continuing to block 7.2 remote entity 120 can send control signal 710 to controller 400. For example, remote entity 120 can send control signal 710 including indications of to report status, trip, set, or the like to controller 400. With some examples, remote entity 120 can send information element 710 to controller 400 via Wi-Fi. Continuing to block 7.3 controller 400 can send control signal 710 to breaker 200. Said differently, controller 400 can relay control signal 710 from remote entity 120 to breaker 200. In some example, controller 400 can send control signal 710 including indications of to report status, trip, set, or the like to breaker 200 via BLE.

Continuing to block 7.4, breaker 200 can take an action based on control signal 710. For example, breaker 200 can trip in response to receiving control signal 710 including an indication to trip. More specifically, breaker 200 can execute fault interrupt instruction 210-1 to cause fault interrupter 214 to interrupt current flow to load line 204 based on receiving control signal 710 including an indication to trip. As another example, breaker 200 can set in response to receiving control signal 710 including an indication to set. More specifically, breaker 200 can execute fault interrupt instruction 210-1 to cause fault interrupter 214 to restore current flow to load line 204 based on receiving control signal 710 including an indication to set. With some examples, breaker 200 can record metering information, operating condition, breaker status, or the like in response to receiving control signal 710 including an indication to report status.

In some examples, technique 700 can further include circle 500/600, where breaker 200 sends an information element (e.g., information element 510) to including an indication of metering information, operating conditions, status, or the like. For example, breaker 200 can send information element 510 to remote entity (e.g., as in technique 500 of FIG. 5, as in technique 600 of FIG. 6, or the like) including an indication of confirmation of tripping, setting, or the like. With some examples, controller 400 can generate control signal 710. As depicted, technique 700 optionally illustrates controller 400 implementing circle 7.1. In such an example, technique 700 could omit circle 7.2 and instead proceed directly to circle 7.3 from circle 7.1.

Figure 8:
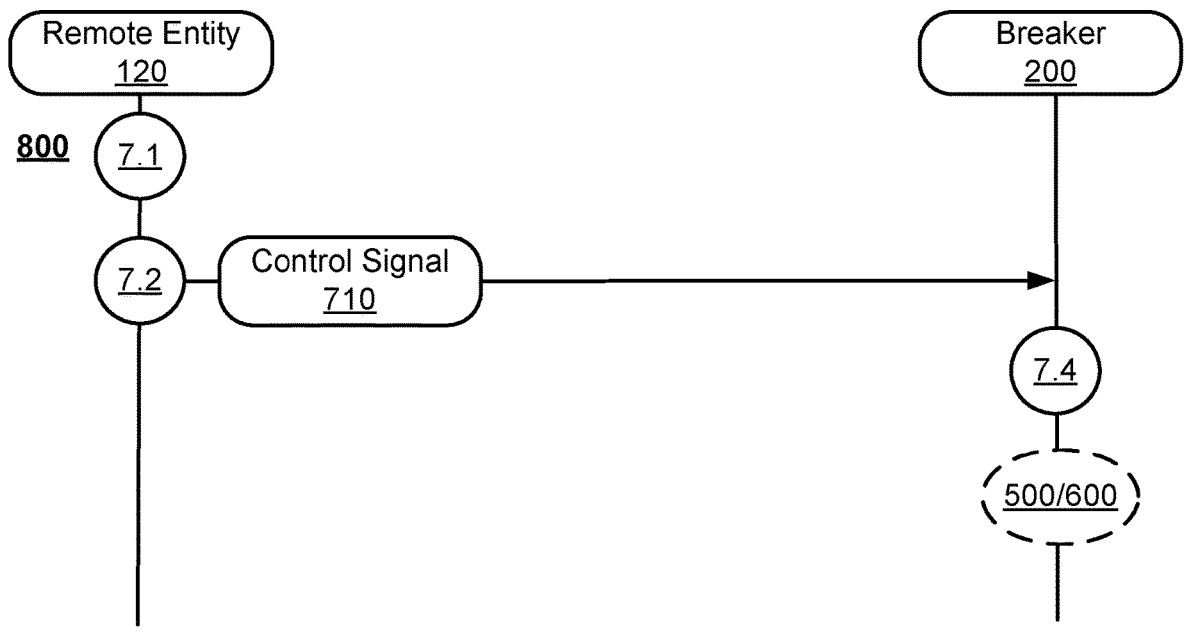
FIG. 8 illustrates a fourth exemplary embodiment of a technique to communicate with a communication enabled circuit breaker.

With some examples, remote entity 120 can directly connect to breaker 200. For example, FIG. 8 depicts technique 800 to communicate with a wireless circuit breaker. The technique 800 may include circles 7.1, 7.2 and 7.4 of technique 700 of FIG. 7. However, as illustrated, at circle 7.2 remote entity 120 may send control signal 710 directly to breaker 200, as opposed to relaying control signal 710 through controller 400.

Figure 9:
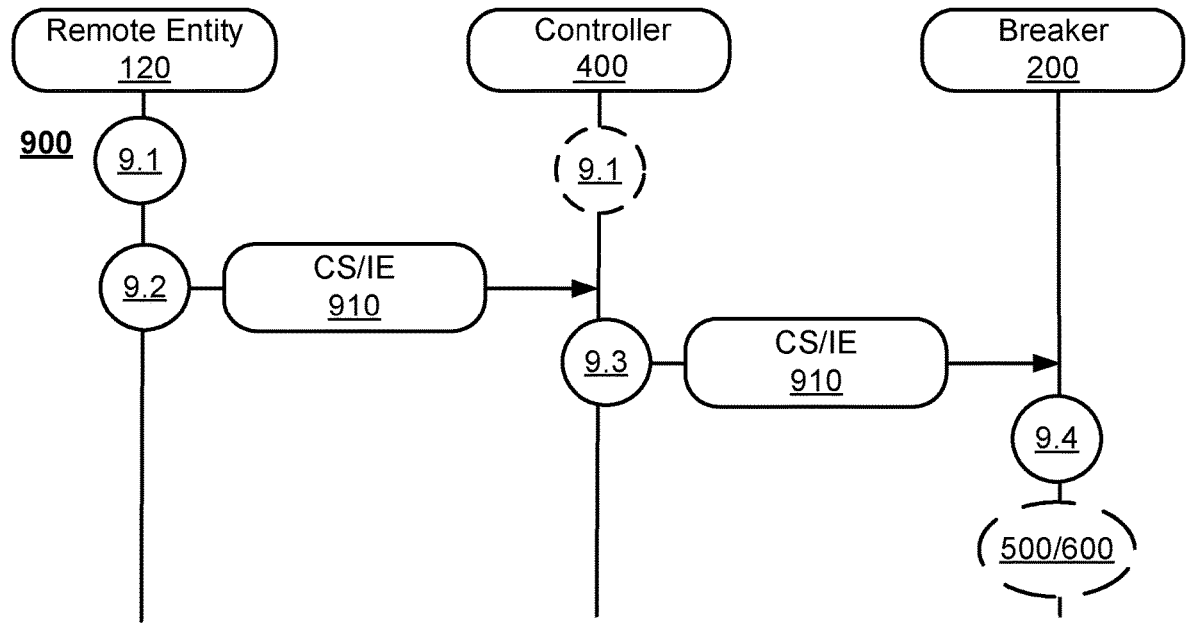
FIG. 9 illustrates a fifth exemplary embodiment of a technique to communicate with a communication enabled circuit breaker.

FIG. 9 depicts a technique 900 to communicate with a wireless circuit breaker. The technique 900 may start at circle 9.1. At circle 9.1, remote entity 120 can generate a control signal and/or information element 910 ('signal 910') comprising an indication to update fault interrupter instructions 210-1 and/or power metering instructions 210-2 of breaker 200. Said differently, remote entity 120 can generate signal 910 comprising an indication to update a firmware of breaker 200.

As noted above, breaker firmware (e.g., fault interrupter instructions 210-1, power metering instructions 210-2, or the like) may generally include parameters of operating conditions of breaker 200. For example, fault interrupter instructions 210-1 can provide conditions intended to trigger a trip event. Said differently, the fault interrupter instructions 210-1 can be configured to control fault condition detection algorithms and/or fault interruption characteristics of the breakers 200. For example, the fault interrupter instructions 210-1 may define an overcurrent trip value in amps and an overcurrent trip response time in seconds. In addition, firmware of breaker 200 may define parameters associated with the breaker 200. Such parameters may include current rating, voltage rating, time current curve characteristics (e.g., the relationship between the sensed overcurrent and the time required under which to trip the wireless circuit breaker 200), status, trip alarm, remote trip, single phase or three phase, and the like.

Remote entity 120, at circle 9.1, can generate updated firmware or updated fault interruption instructions 404-1. In some examples, remote entity 9.1 can generate updated firmware based on historical data associated with breaker 200 stored in database 118. This is described in greater detail below referencing FIG. 11. However, in general, remote entity 120 can generate updated firmware for breaker 200 to 'customize' breaker 200 to a load (e.g., HVAC, refrigerator, television, or the like), to customize breaker 200 to historical operating conditions of a branch circuit coupled to load line 204 of breaker 200, or the like. It is noted, updated firmware for breaker 200 could be generated based on specific customers (e.g., residential, commercial, commercial property policies, or the like), based on the branch circuit to which the breaker 200 is coupled, or based on the type of load coupled to the branch circuit.

Continuing to block 9.2 remote entity 120 can send signal 910 to controller 400. For example, remote entity 120 can send signal 910 including indications to update breaker firmware (e.g., a control signal to update firmware and an indication of the updated firmware, or the like) to controller 400. With some examples, remote entity 120 can send signal 910 to controller 400 via Wi-Fi. Continuing to block 9.3 controller 400 can send signal 910 to breaker 200. Said differently, controller 400 can relay signal 910 from remote entity 120 to breaker 200. In some example, controller 400 can send control signal 910 including indications to update breaker firmware to breaker 200 via BLE.

Continuing to block 9.4, breaker 200 can take an action based on signal 910. For example, breaker 200 can implement an update procedure to update firmware based on signal 910. In general, at circle 9.4, breaker 200 could (1) trip, (2) update firmware, (3) run a self-test to test the updated firmware, and/or (4) set. In some examples, technique 900 can further include circle 500/600, where breaker 200 sends an information element (e.g., information element 510) to including an indication of confirmation of updated firmware. For example, breaker 200 can send information element 510 to remote entity (e.g., as in technique 500 of FIG. 5, as in technique 600 of FIG. 6, or the like) including an indication of breaker 200 firmware version number and fault interrupter 214 status. With some examples, controller 400 can generate signal 910. As depicted, technique 900 optionally illustrates controller 400 implementing circle 9.1. In such an example, technique 900 could omit circle 9.2 and instead proceed directly to circle 9.3 from circle 9.1.

Figure 10:
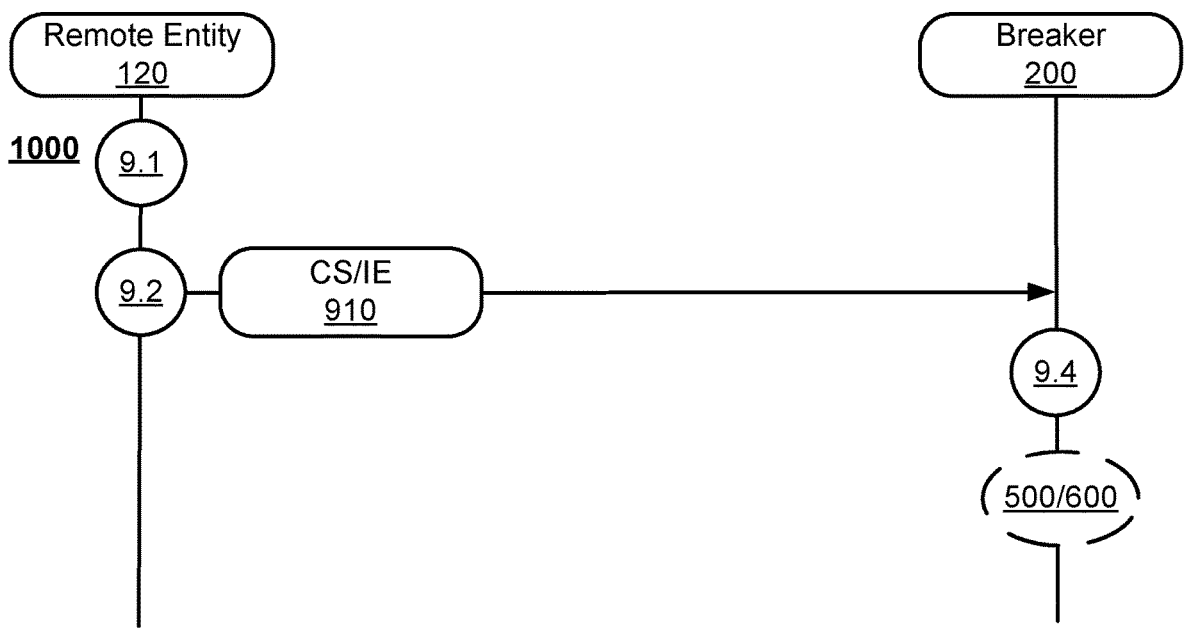
FIG. 10 illustrates a sixth exemplary embodiment of a technique to communicate with a communication enabled circuit breaker.

With some examples, remote entity 120 can directly connect to breaker 200. For example, FIG. 10 depicts technique 1000 to communicate with a wireless circuit breaker. The technique 1000 may include circles 9.1, 9.2 and 9.4 of technique 900 of FIG. 9. However, as illustrated, at circle 9.2 remote entity 120 may send signal 910 directly to breaker 200, as opposed to relaying signal 910 through controller 400.

In some examples, techniques 900 and/or 1000 can be iteratively performed. For example, technique 900 and/or 1000 can be iteratively performed to enable an electrician (or another suitable user) to interface in real-time with breaker 200. For example, the electrician may connect to breaker 200 via an application executed on a remote entity 120 (e.g., mobile device 112) or the like. Execution of the application can cause remote entity 120 to generate signal 910 including an indication for breaker 200 to enter a 'service mode.' In such an example service mode, the circuit breaker 200 may not trip upon the occurrence of a fault but, rather, may communicate (e.g., as in technique 500, 600, or the like) data to remote entity 120 for analysis by either the remote entity 120, the electrician, or other suitable entity. In some examples, while in service mode, the breaker 200 may be configured to not trip upon the occurrence of an arc fault, a ground fault, an overcurrent fault, or a combination of these. In other words, while in the service mode, the breaker 200 may be configured to trip upon detection of an overcurrent but not trip upon detection of an arc fault. In some examples, the circuit breaker 200 while in service mode may indicate, by any number of methods, when it would otherwise trip. Examples of such indication include flashing of LED(s) or transmitting the indication to the remote entity along with operating parameters (e.g., metering information, or the like) incident to the tripping event.

Furthermore, the remote entity, the electrician, or other suitable user, can analyze the indications of tripping along with operating parameters and adjust the fault interrupter instructions 210-1 and transmit updated fault interrupter instructions 404-1 to the breaker 200 and update the breaker according (e.g., as in technique 900, 1000, or the like). In this manner, the fault interrupter instructions 210-1 can be refined/tailored to avoid unintentional fault interrupts (e.g., nuisance tripping) of the breaker 200. With some examples, fault interrupter instructions 210-1 may be refined, updated as described herein during initial installation of the breaker 200. With some examples, fault interrupter instructions 210-1 can be refined updated remotely (e.g., by a manufacturer, by a service center, or the like) after deployment of breaker 200, for example, because of repeated nuisance tripping, or the like.

Figure 11:
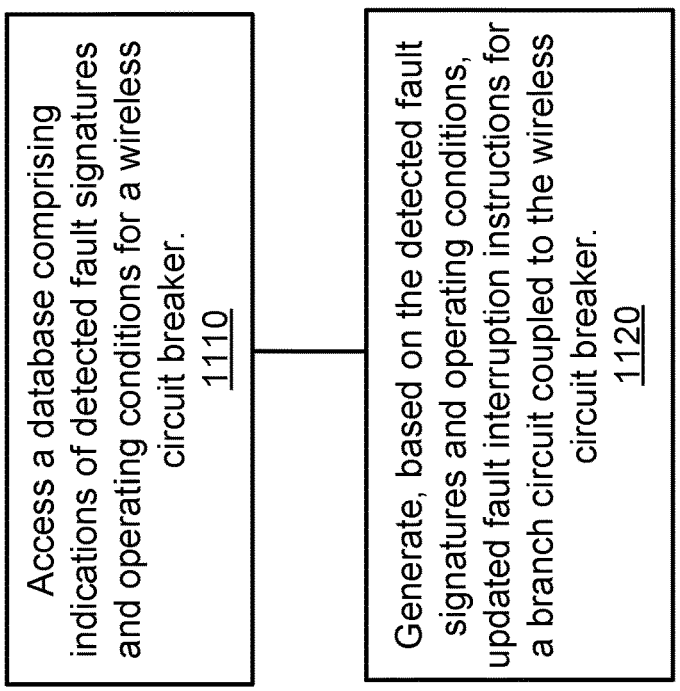
FIG. 11 illustrates a first exemplary embodiment of a logic flow.

FIG. 11 illustrates a logic flow 1100 to generate updated fault interrupter instructions per embodiments of the present disclosure. Some or all the communications and operations associated with the logic flow 1100 may be embodied as one or more computer executable instruction. Such computer executable instructions may be stored in the storage medium, such the memory 208/402, or a plurality of disparate storage mediums. A computing device, such as the processor 212/406, may execute the stored computer executable instructions.

The logic flow 1100 may begin with block 1110. At block 1110 "access a database comprising indications of detected fault signatures and operating conditions for a wireless circuit breaker" a processor can access a database comprising indications of detected fault signatures and operating conditions for a wireless circuit breaker. For example, a remote entity 120 (e.g., computing device 112, mobile device 110, or a cloud-based processing device accessible via Internet 114, or the like) can access database 118. Remote entity 120 can access historical data associated with breaker 200 (e.g., a breaker 104-n of panel 102, or the like) including detected fault signatures and operating conditions incident to the detected fault signatures via the Internet 114.

Continuing to block 1120 "generate, based on the detected fault signatures and operating conditions, updated fault interruption instructions for a branch circuit coupled to the wireless circuit breaker" a processor can generate updated fault interrupter instructions based on the historical data including detected fault signatures and operating conditions incident to the detected fault signatures. With some examples, remote entity 120 (e.g., computing device 112, mobile device 110, or a cloud-based processing device accessible via Internet 114, or the like) can generate updated fault interrupter instructions for breaker 200 based on historical data (e.g., detected fault signatures, operating conditions, or the like) in database 118 associated with breaker 200.

In some examples, the processing device can generate updated fault interrupter instructions to correct repeated nuisance detection of fault signatures. In some examples, the processing device can generate updated fault interrupter instructions based on a detected load type coupled to breaker 200. With some examples, the processing device can implement machine learning, or another data processing technique to generate the updated fault interrupter instructions.

In some examples, at block 1120, processing device may receive updated fault interrupter instructions from a user (e.g., electrician, manufacturer, or the like). For example, with some implementations, a manufacturer may access database 118 via Internet 114 to generate updated fault interrupter instructions and provide the updated fault interrupter instructions at block 1120. As noted above, the updated fault interrupter instructions could be generated based on specific customers (e.g., residential, commercial, commercial property policies, or the like), based on the branch circuit to which the breaker 200 is coupled, or based on the type of load coupled to the branch circuit.

Figure 12:
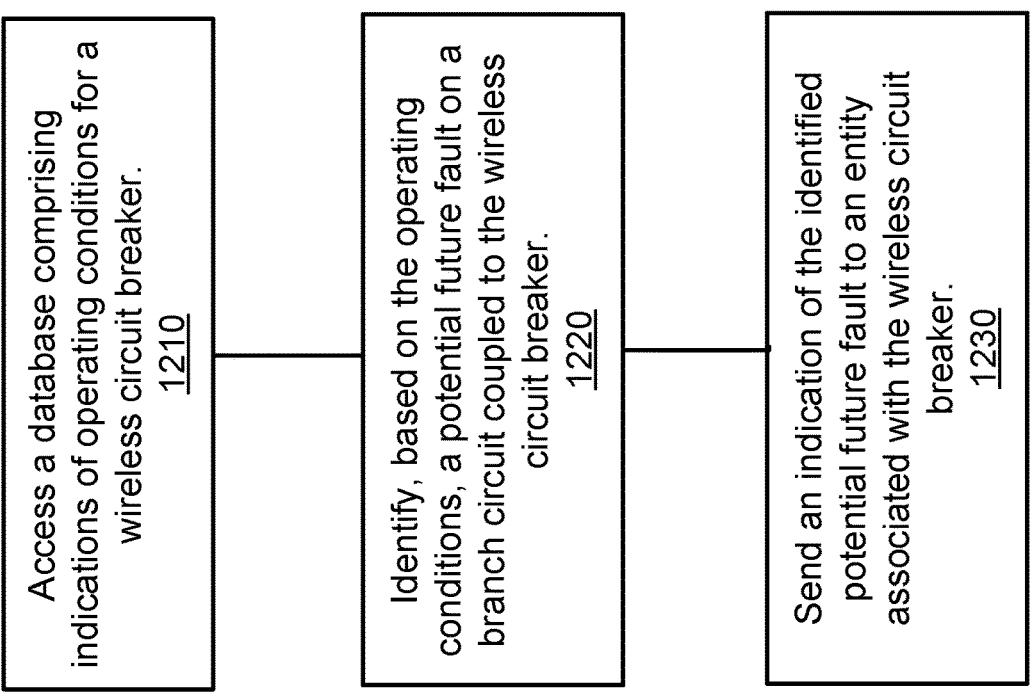
FIG. 12 illustrates a second exemplary embodiment of a logic flow.

FIG. 12 illustrates a logic flow 1200 to generate updated fault interrupter instructions per embodiments of the present disclosure. Some or all the communications and operations associated with the logic flow 1200 may be embodied as one or more computer executable instruction. Such computer executable instructions may be stored in the storage medium, such the memory 208/402, or a plurality of disparate storage mediums. A computing device, such as the processor 212/406, may execute the stored computer executable instructions.

The logic flow 1200 may begin with block 1210. At block 1210 "access a database comprising indications of operating conditions for a wireless circuit breaker" a processor can access a database comprising indications of operating conditions for a wireless circuit breaker. For example, a remote entity 120 (e.g., computing device 112, mobile device 110, or a cloud-based processing device accessible via Internet 114, or the like) can access database 118. Remote entity 120 can access historical data associated with breaker 200 (e.g., a breaker 104-*n* of panel 102, or the like) including detected fault signatures and/or operating conditions via the Internet 114.

Continuing to block 1220 "identify, based on the detected fault signatures and operating conditions, a potential future fault on a branch circuit coupled to the wireless circuit breaker" a processor can identify a potential future fault on a branch circuit coupled to the wireless circuit breaker. For example, remote entity 120 (e.g., computing device 112, mobile device 110, or a cloud-based processing device accessible via Internet 114, or the like) can identify a potential future fault based on historical data (e.g., detected fault signatures, operating conditions, or the like) in database 118 associated with breaker 200. As a specific example, processor can identify a potential future fault, such as, for example, a failing load (e.g., HVAC compressor, motor, or the like) based on historical data in database 118.

Continuing to block 1230 "send an indication of the identified potential future fault to an entity associated with the wireless circuit breaker" a processor can send an indication (e.g., alert, text message, email, automated phone call, or the like) comprising an indication of the identified potential future fault to a responsible party for the breaker 200 (e.g., owner of the panel 102 in which breaker 200 is deployed, or the like).

In some examples, logic flows 1100 and/or 1200 might include information from various entities related to breaker 200. For example, as detailed herein, auxiliary sensors 130 coupled be coupled to panel 102, and particularly controller 106. Information from these sensors (e.g., IoT devices, temperature sensors, weather monitors, security systems, location information, etc.) can be included in the analysis of the historical data indicated in database 118 to provide alerts, updated firmware, updated fault tripping settings, as detailed herein.

Figure 13:
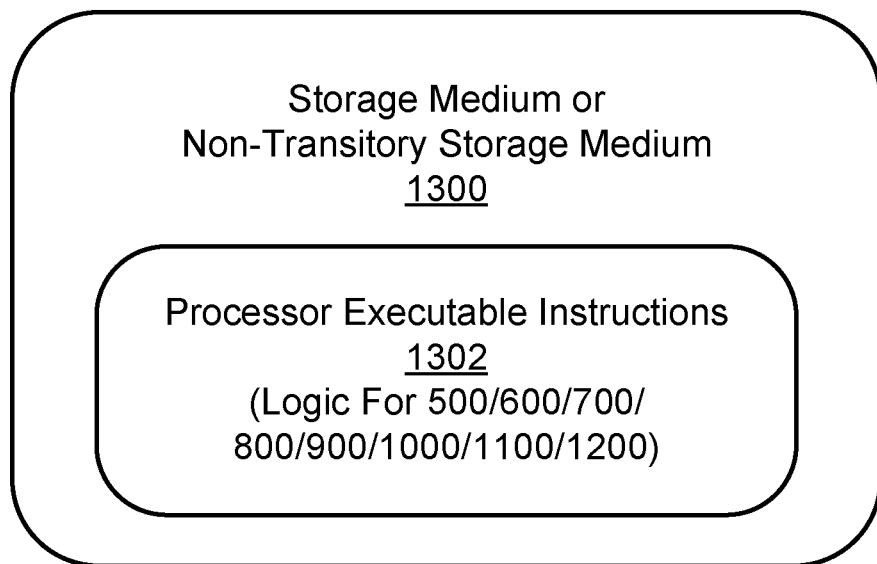
FIG. 13 illustrates a storage medium according to an exemplary embodiment.

FIG. 13 illustrates an embodiment of a storage medium 1300. The storage medium 600 may comprise an article of manufacture. In some examples, the storage medium 1300 may include any non-transitory computer readable medium or machine readable medium, such as an optical, magnetic or semiconductor storage. The storage medium 1300 may store various types of processor executable instructions e.g., 1302 executable by a processor (e.g., processor 212, processor 222, processor 406, processor 414-1, processor 414-2, etc.). Storage medium 1300 may store processor executable instructions 1302, which when executed by a processor can cause the processor to implement any one or more of techniques 500, 600, 700, 800, 900, 1000 and/or logic flows 1100 and/or 1200.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

While a wireless circuit breaker, a wireless circuit breaker controller, wireless technology enabled circuit breakers and methods for using the same have been described with reference to certain embodiments, it will be understood by those skilled in the art that various changes may be made, and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

Furthermore, the following examples are provided to more fully described the embodiments of the present disclosure:

Example 1. A circuit breaker comprising: a housing, a user actuator, a line side phase terminal, a load side phase terminal, and a neutral terminal; a circuit interrupter configured to selectively enable electrical communication between the line side phase terminal and the load side phase terminal; an electrical sensor in electrical communication with at least one of the line side phase terminal, the load side phase terminal, and the neutral terminal; a memory comprising circuit interrupter instructions, data acquisition instructions, and communication instructions; wireless communications circuitry; a processor electrically coupled to the line side phase terminal, wherein the processor is in electrical communication with each of the circuit interrupter, the electrical sensor, the memory, and the communications circuitry; wherein the processor executes the data acquisition instructions to periodically collect data related to one or more electrical parameters from the electrical sensor and store the data in the memory; and wherein the processor is configured to communicate the data to a remote device via the wireless communication circuitry.

Example 2. The circuit breaker of example 1, wherein the remote device is a mobile phone, a laptop computer, or a tablet computer.

Example 3. The circuit breaker of example 1, wherein the remote device is a communication enabled circuit breaker controller.

Example 4. The circuit breaker of example 1, wherein at least one of the one or more electrical parameters are current flow between the line side phase terminal and the load side phase terminal, current flow between the line side phase terminal and the neutral phase terminal, voltage level of the line side phase terminal, power consumed via the load side phase terminal, humidity, or temperature.

Example 5. The circuit breaker of example 1, wherein the processor executes the data acquisition instructions to periodically collect data related to a status of the circuit breaker and communicates the data including the status to the remote device via the wireless communication circuitry.

Example 6. The circuit breaker of example 5, the status comprising indications of a signature of a load coupled to the load side phase terminal or indications of tripping of the circuit interrupter.

Example 7. The circuit breaker of example 1, wherein the wireless communication circuitry is arranged to establish a wireless communication channel via one of Bluetooth, Bluetooth Low Energy, Wi-Fi, ZigBee, or near field communication.

Example 8. A communication enabled circuit breaker controller, comprising: wireless communications circuitry; a processor electrically coupled to the wireless communication circuitry; and a memory coupled to the processor, the memory comprising instructions, which when executed by the processor, cause processor to receive from at least one communication enabled circuit breaker, via the wireless communication circuitry, data comprising indications of one or more electrical parameters of the at least one communication enabled circuit breaker.

Example 9. The communication enabled circuit breaker controller of example 8, wherein the processor executes the instructions to add the data to a database associated with the at least one communication enabled circuit breakers.

Example 10. The communication enabled circuit breaker controller of example 8, wherein the processor executes the instructions to determine at least one of power factor, active power factor, reactive power factor, power loss, or voltage sags based on the data.

Example 11. The communication enabled circuit breaker controller of example 8, wherein the processor executes the instructions to send the data to a power grid operator.

Example 12. The communication enabled circuit breaker controller of example 8, wherein the processor executes the instructions to send a command to one of the at least one communication enabled circuit breakers to cause the one of the at least one communication enabled circuit breakers to send updated data to the communication enabled circuit breaker controller.

Example 13. The communication enabled circuit breaker controller of example 8, wherein the wireless communication circuitry is arranged to establish a wireless communication channel via one of Bluetooth, Bluetooth Low Energy, Wi-Fi, ZigBee, or near field communication.

Example 14. An apparatus comprising: a line side phase terminal; a load side phase terminal; a memory comprising fault interrupter instructions and power metering instructions; an interrupter coupled to the memory, the interrupter to interrupt an electrical communication between the line side phase terminal and the load side phase terminal based at least in part on the fault interrupter instructions; an electrical sensor coupled to at least one of the line side phase terminal or the load side phase terminal; a wireless radio; and a processor coupled to the memory and the wireless radio, in response to executing the power metering instructions the processor to: receive signals from the electrical sensor; generate data related to one or more electrical parameters of the apparatus based on the received signals; and send the data to a remote entity via the wireless radio.

Example 15. The apparatus of example 14, wherein the remote entity is a mobile phone, a laptop computer, a tablet computer or a communication enabled circuit breaker controller.

Example 16. The apparatus of example 14, wherein at least one of the one or more electrical parameters are current flow between the line side phase terminal and the load side phase terminal, voltage level of the line side phase terminal, power consumed via the load side phase terminal, humidity, or temperature.

Example 17. The apparatus of example 14, wherein the processor executes the power metering instructions to repeatedly receive signals from the electrical sensor, generate data related to one or more electrical parameters based on the repeatedly received signals, and communicates the data to the remote entity via the wireless radio.

Example 18. The apparatus of example 14, wherein the processor executes the power metering instructions to determine a status of the apparatus and send the status to the remote entity, the status comprising indications of a signature of a load coupled to the load side phase terminal or indications of tripping of the interrupter.

Example 19. The apparatus of example 14, the wireless radio arranged to communicate via Bluetooth, Bluetooth Low Energy, Wi-Fi, ZigBee, or near field communication.

Example 20. A system comprising: at least one communication enabled circuit breaker, each of the at least one communication enabled circuit breakers comprising: a line side phase terminal; a load side phase terminal; a first memory comprising fault interrupter instructions and power metering instructions; a fault interrupter coupled to the first memory, the fault interrupter to interrupt an electrical communication between the line side phase terminal and the load side phase terminal based at least in part on the fault interrupter instructions; an electrical sensor coupled to at least one of the line side phase terminal or the load side phase terminal; a first wireless radio; and a first processor coupled to the first memory and the first wireless radio; and a circuit breaker controller comprising: a second wireless radio; a second memory comprising controller instructions; and a second processor electrically coupled to the second wireless radio and the second memory; wherein the first processor, in response to executing the power metering instructions to receive signals from the electrical sensor, generate data related to one or more electrical parameters of the at least one communication enabled circuit breaker based on the received signals, and send the data to the circuit breaker controller via the first wireless radio; and wherein the second processor, in response to executing the controller instruction to receive the data from the at least one communication enabled circuit breakers via the second wireless radio.

Example 21. The system of example 20, wherein at least one of the one or more electrical parameters are current flow between the line side phase terminal and the load side phase terminal, voltage level of the line side phase terminal, power consumed via the load side phase terminal, humidity, or temperature.

Example 22. The system of example 20, wherein the first processor executes the power metering instructions to collect a status of the at least one communication enabled circuit breaker and communicates the status to the circuit breaker controller via the first wireless radio.

Example 23. The system of example 22, the status comprising indications of a signature of a load coupled to the load side phase terminal or indications of tripping of the circuit interrupter.

Example 24. The system of example 20, wherein the first and the second wireless radios are arranged to establish a wireless communication channel via Bluetooth, Bluetooth Low Energy, Wi-Fi, ZigBee, or near field communication.

Example 25. A system comprising: at least one communication enabled circuit breaker, each of the at least one communication enabled circuit breakers comprising: a line side phase terminal; a load side phase terminal; a first memory comprising fault interrupter instructions and power metering instructions; a fault interrupter coupled to the first memory, the fault interrupter to interrupt an electrical communication between the line side phase terminal and the load side phase terminal based at least in part on the fault interrupter instructions; an electrical sensor coupled to at least one of the line side phase terminal or the load side phase terminal; a first wireless radio; and a first processor coupled to the first memory and the first wireless radio; and a remote entity comprising: a second wireless radio; a second memory comprising remote entity instructions; and a second processor electrically coupled to the second wireless radio and the second memory; wherein the first processor, in response to executing the power metering instructions to receive signals from the electrical sensor, generate data related to one or more electrical parameters of the at least one communication enabled circuit breaker based on the received signals, and send the data to the remote entity via the wireless radio; and wherein the second processor, in response to executing the remote entity instruction to receive the data from the at least one communication enabled circuit breakers via the second wireless radio.

Example 26. The system of example 25, wherein the second processor, in response to executing the remote entity instruction, adds the data to a database associated with the at least one communication enabled circuit breakers.

Example 27. The system of example 26, the database accessible to the remote entity via the Internet.

Example 28. The system of example 25, wherein the remote entity is a mobile phone, a laptop computer, or a tablet computer.

Example 29. A method comprising: accessing a database comprising information of a plurality of faults reported by a communication enabled circuit breaker and historical operating parameters of the communication enabled circuit breaker; and generating updated fault interruption instructions for the communication enabled circuit breaker based on the plurality of faults and the historical operating parameters.

Example 30. The method of example 29, wherein the database is accessible via the Internet and the communication enabled circuit breaker periodically communicates faults or current operating parameters to be added to the database.

Example 31. The method of example 30, wherein the current operating parameters include at least one of current flow, voltage level, humidity, or temperature.

Example 32. The method of example 30, comprising accessing the database by a manufacturer of the communication enabled circuit breaker and generating, by the manufacturer, the updated fault interruption instructions.

Example 33. The method of example 30, wherein the operating parameters comprise indications of a signature of a load coupled to the communication enabled circuit breaker, the method comprising generating updated fault interruption instructions for the communication enabled circuit breaker based on the plurality of faults, the historical operating parameters and the signature of the load.

Example 34. A method comprising: accessing a database comprising information of a plurality of faults reported by a communication enabled circuit breaker and historical operating parameters of the communication enabled circuit breaker; monitor current operating parameters of the communication enabled circuit breaker; and predict a future fault of the communication enabled circuit breaker based on the plurality of faults, the historical operating parameters, and the current operating parameters.

Example 35. The method of example 34, wherein the database is accessible via the Internet, monitoring current operating parameters comprises, periodically receiving the current operating parameters from the from the communication enabled circuit breaker.

Example 36. The method of example 34, wherein the historical operating parameters and the current operating parameters include at least one of wherein the current operating parameters include at least one of current flow, voltage level, humidity, or temperature.

Example 37. The method of example 34, comprising sending an alert to a user, the alert comprising an indication of the future fault.

Example 38. A communication enabled circuit breaker comprising: a line side phase terminal; a load side phase terminal; a memory comprising instructions; a fault interrupter coupled to the memory, the fault interrupter to interrupt an electrical communication between the line side phase terminal and the load side phase terminal; a wireless radio; and a processor coupled to the memory and the wireless radio, the processor in response to executing the power metering instructions, to: receive a control signal comprising an indication to initiate at least one of report operating information to a remote entity, interrupt the electrical communication between the line side phase terminal and the load side phase terminal, adjust an operating parameter, or compensate for under voltage conditions.

Example 39. A method comprising: establishing a communication channel with one or more communication enabled circuit breakers; and receiving information from at least one of the one or more communication enabled circuit breakers via the established communication channel, the information comprising indications of at least one of: an operating condition, an operating parameter or a status.

Example 40. A method comprising: receiving information from a communication enabled circuit breaker, the communication enabled circuit breaker comprising a fault interrupter, the information comprising indications of at least one of: an operating condition, an operating parameter or a status; and diagnosing a fault with the communication enabled circuit breaker, the fault comprising a self-test fault, a fault with fault interrupter, a contact welding fault, or a communication interference fault.

Example 41. A method comprising: receiving information from a communication enabled circuit breaker, the communication enabled circuit breaker comprising a fault interrupter, the information comprising indications of at least one of: an operating condition, an operating parameter or a status; and adding the indications to a database associated with the communication enabled circuit breaker.

Example 42. A method comprising: accessing a database comprising information of a communication enabled circuit breaker, the information comprising indications of at least one of: an operating condition, an operating parameter or a status; and analyzing the information to at least one of: determine whether the communication enabled circuit breaker is operating normally or a branch circuit operably coupled to the communication enabled circuit breaker is operating normally; wherein the accessing and analyzing is done via a mobile device, via a circuit breaker controller, or via the circuit breaker.

Example 43. A method comprising: accessing a database comprising information of a communication enabled circuit breaker, the information comprising indications of at least one of: an operating condition, an operating parameter or a status; and customizing a firmware for the communication enabled circuit breaker based on the information; wherein the firmware is customized for at least one of a residential user, a commercial user, a branch circuit coupled to the communication enabled circuit breaker, or a load coupled to the communication enabled circuit breaker.

Example 44. A method comprising: sending, from a computing device, authentication credentials to access a database for a communication enabled circuit breaker panel system, the communication enabled circuit breaker panel system comprising one or more communication enabled circuit breakers, the database comprising indications of at least one of an operating condition, an operating parameter or a status, for each of the one or more communication enabled circuit breakers and comprising an indication of a global setting for the communication enabled circuit breaker panel; and modifying the global setting for the communication enabled circuit breaker panel; or requesting the indications of at least one of the one or more communication enabled circuit breakers.

Example 45. A method comprising: accessing a database comprising indications of a plurality of faults reported by a communication enabled circuit breaker and indications of historical operating parameters of the communication enabled circuit breaker; monitor current operating parameters of the communication enabled circuit breaker; and receiving related information, the related information comprising at least one of user input, user feedback, or observations from related systems; and predicting a future fault of the communication enabled circuit breaker based on the plurality of faults, the historical operating parameters, the current operating parameters, and the related information; or updating a firmware for the communication enabled circuit breaker based on the plurality of faults, the historical operating parameters, the current operating parameters, and the related information.

Example 46. A system comprising: a circuit breaker controller comprising a wireless radio to provide a wireless network to communicatively couple to a plurality of communication enabled circuit breakers; and a plurality of communication enabled circuit breakers, each of the plurality of communication enabled circuit breakers comprising a wireless radio, the wireless radio of each of the plurality of communication enabled circuit breakers to cooperate to extend or mesh the wireless network provided by the circuit breaker controller to communicatively couple each of the plurality of communication enable circuit breakers to the circuit breaker controller.

We claim:

1. A wirelessly communicating circuit breaker comprising:
a line side phase terminal;
a load side phase terminal;
a memory comprising fault interrupter instructions and power metering instructions;
an interrupter coupled to the memory, the interrupter to interrupt an electrical communication between the line side phase terminal and the load side phase terminal based at least in part on the fault interrupter instructions;
an electrical sensor coupled to at least one of the line side phase terminal and the load side phase terminal;
a wireless radio; and
a processor coupled to the memory and the wireless radio, in response to executing the power metering instructions the processor to:
receive signals from the electrical sensor;
generate data related to one or more electrical parameters of the wirelessly communicating circuit breaker based on the received signals;
send the data to a remote entity via the wireless radio; and
record a status of the interrupter, the status comprising whether the interrupter is in an open state or in a closed state, whether the interrupter was tripped or set locally or remotely, or a combination thereof;
the processor to execute further instructions to cause the interrupter to enter a service mode in response to receipt of a remote entity signal from the remote entity, the service mode to prevent the interrupter from tripping based on occurrence of one or more of an arc fault, a ground fault, an overcurrent fault, or any combination thereof; the processor to output an alert signal to cause an alert based on a tripping event that would cause the interrupter to trip if the interrupter were not in the service mode;
wherein the wirelessly communicating circuit breaker is controllable remotely based on receipt of a control signal, to report a status of the wirelessly communicating circuit breaker, to open and close the interrupter, and to update the fault interrupter instructions.

2. The wirelessly communicating circuit breaker of claim 1, further comprising an indicator coupled to the processor and to the memory, wherein the memory further comprises alert settings, wherein the indicator comprises a visual indicator, an audible indicator, or a combination thereof.

3. The wirelessly communicating circuit breaker of claim 2, wherein the processor to execute further instructions to output the alert signal to cause the alert via the indicator, by sending the alert to an alert location, or a combination thereof, based on the alert settings in the memory; the alert location comprising an email, a text, a phone call, or a combination thereof.

4. The wirelessly communicating circuit breaker of claim 3, the indicator comprising a light emitting diode (LED), wherein the processor causes the LED to illuminate to a predefined color, illumination frequency, or a combination thereof.

5. The wirelessly communicating circuit breaker of claim 3, the processor to execute further instructions to output the alert signal to cause the alert based on historical data, the historical data comprising events, electrical parameters, breaker diagnostics, breaker cycling, or a combination thereof.

6. The wirelessly communicating circuit breaker of claim 3, the processor to identify, based on detected fault signatures and operating conditions, a potential future fault on a branch circuit coupled to the wirelessly communicating circuit breaker, and to indicate the alert based on the potential future fault.

7. A system comprising:
a building panel to house a circuit breaker controller and one or more wirelessly communicating circuit breakers; and
a wirelessly communicating circuit breaker housed within the building panel, the wirelessly communicating circuit breaker comprising:
a line side phase terminal;
a load side phase terminal;
a memory comprising communication instructions, fault interrupter instructions, and power metering instructions;
an interrupter coupled to a processor, the interrupter to interrupt an electrical communication between the line side phase terminal and the load side phase terminal based at least in part on the fault interrupter instructions;
an electrical sensor coupled to at least one of the line side phase terminal or the load side phase terminal;
a wireless radio; and
the processor coupled to the memory and the wireless radio, wherein in response to executing the power metering instructions, the processor to:
receive signals from the electrical sensor;
generate data related to one or more electrical parameters of the wirelessly communicating circuit breaker based on the received signals;
send the data to a remote entity via the wireless radio; and
record a status of the interrupter, the status comprising whether the interrupter is in an open state or in a closed state, whether the interrupter was tripped or set locally or remotely, or a combination thereof;
wherein the processor executes further instructions to enter a service mode in response to a signal from the remote entity, the processor, while in the service mode, configured to trip the interrupter upon detection of an overcurrent but not trip upon detection of an arc fault;
wherein the wirelessly communicating circuit breaker is controllable wirelessly by the remote entity based on receipt of a control signal, to report a status of the wirelessly communicating circuit breaker, to open and close the interrupter, and to update the fault interrupter instructions.

8. The system of claim 7, wherein the remote entity is a mobile phone, a laptop computer, a tablet computer, or the circuit breaker controller, wherein in response to executing the communication instructions, the processor sends the data to the remote entity based on receipt of a poll.

9. The system of claim 8, wherein in response to executing the communication instructions, the processor sends the data to the remote entity periodically.

10. The system of claim 7, wherein the processor executes the power metering instructions to capture historical data including fault signatures and operating conditions incident to fault signatures, the power metering instructions to repeatedly receive signals from the electrical sensor, and generate data related to one or more electrical parameters based on the repeatedly received signals, wherein the data comprises one or more operating conditions, the one or more operating conditions including energy, voltage, current, power factor, active power factor, reactive power factor, power loss, voltage sags, power consumption, temperature, time, date, or a combination thereof.

11. The system of claim 10, wherein the processor executes the power metering instructions to determine and send to the remote entity:
a signature of one or more loads coupled to the load side phase terminal;
an indication of a fault detected by the interrupter;
an indication whether the interrupter is in the open state or the closed state;
an indication whether the interrupter is in a tripped open state;
a local open state or a remote open state;
a version number of one or more of the communication instructions;
the power metering instructions;
the fault interrupter instructions; or
a combination thereof.

12. The system of claim 7, the wireless radio arranged to communicate via a communication protocol, the communication protocol being one or more of a personal area network, a mesh network, a local area network, a wide area network, a low energy network, a cellular network, or near field communication.

13. The system of claim 7, the electrical sensor to collect signals indicative of:
current between a line side phase connection and a load side phase connection; and
current and a voltage between the line side phase connection and a neutral.

14. The system of claim 7, wherein the processor executes further instructions to determine metering information, the determining metering information occurring at a rate of between 4 and 8 kiloHertz (kHz), wherein the wirelessly communicating circuit breaker is configured to operate in conjunction with single-phase, split-phase, 3-phase delta, or 3-phase star electrical power distribution systems, and wherein the wirelessly communicating circuit breaker is configured to operate at a voltage of 120/240, 120/208, 265/460or 277/480.

15. The system of claim 7, wherein the data comprises indications of a unique identifier of the wirelessly communicating circuit breaker, current, voltage, root mean square (RMS) current, RMS voltage, power, reactive power, active power, reactive energy, active energy, power quality, energy consumption, energy feedback to power grid, or a combination thereof.

16. The system of claim 7, wherein the electrical parameters comprise indications of one or more of current, voltage noise, differential current, or differential voltage, observed proximate to the trip incident.

17. The system of claim 7, wherein the fault interrupter instructions comprise instructions to sense the overcurrent, the arc fault, a ground fault, an internal fault within the wirelessly communicating circuit breaker, or a combination thereof.

18. A system comprising:
- at least one communication enabled circuit breaker, each of the at least one communication enabled circuit breaker comprising:
  - a line side phase terminal;
  - a load side phase terminal;
  - a first memory comprising fault interrupter instructions and power metering instructions;
  - a fault interrupter coupled to the first memory, the fault interrupter to interrupt an electrical communication between the line side phase terminal and the load side phase terminal based at least in part on the fault interrupter instructions;
  - an electrical sensor coupled to at least one of the line side phase terminal or the load side phase terminal;
  - a first wireless radio; and
  - a first processor coupled to the first memory and the first wireless radio; and
- a circuit breaker controller comprising:
  - a second wireless radio;
  - a second memory comprising controller instructions; and
  - a second processor electrically coupled to the second wireless radio and the second memory;
- wherein the first processor, in response to executing the power metering instructions to receive signals from the electrical sensor, is configured to:
  - generate data related to one or more electrical parameters of the at least one communication enabled circuit breaker based on the received signals, and
  - send the data to the circuit breaker controller via the first wireless radio, wherein the data comprises historical data including fault signatures and operating conditions incident to the fault signatures; and
  - record a status of the fault interrupter, the status comprising whether the fault interrupter is in an open state or in a closed state, whether the fault interrupter was tripped or set locally or remotely, or a combination thereof;
- the first processor to execute further instructions to cause the fault interrupter to enter a service mode in response to receipt of a signal from a remote entity, the service mode to prevent the fault interrupter from tripping based on occurrence of an arc fault, a ground fault, an overcurrent fault, or any combination thereof;
- wherein the at least one communication enabled circuit breaker is controllable remotely based on receipt of a control signal, to report a status of the at least one communication enabled circuit breaker, to open and close the fault interrupter, and to update the fault interrupter instructions.

19. The system of claim 18, wherein the operating conditions comprise an energy consumption, a voltage, a current, a temperature, a humidity, a power consumption, a voltage noise, a differential current and voltage, or a combination thereof.

20. The system of claim 18, wherein the first processor executes the power metering instructions to collect fault signatures and operating conditions including a date, a time, the status of the at least one communication enabled circuit breaker and to communicate the fault signatures and operating conditions, a potential future fault, and an indication of an alert based on the potential future fault to the circuit breaker controller via the first wireless radio, the fault signatures and operating conditions comprising indications of a signature of a load coupled to the load side phase terminal, whether the fault interrupter is in the open state or in the closed state, whether the at least one communication enabled circuit breaker was tripped or set locally or remotely, or a combination thereof.

21. The system of claim 20, wherein the first processor executes the power metering instructions to collect the status of the at least one communication enabled circuit breaker incident to a fault and to communicate the status of the at least one communication enabled circuit breaker to the circuit breaker controller via the first wireless radio, the status of the at least one communication enabled circuit breaker comprising a unique identifier of the at least one communication enabled circuit breaker, a time and date of a trip incident, a load signature that caused the trip incident, a zone or area that is without power because of the trip incident, or a combination thereof.

22. The system of claim 18, wherein the first wireless radio and the second wireless radio arranged to communicate via a communication protocol for a personal area network, a mesh network, a local area network, a wide area network, a low energy network, a cellular network, or near field communication.

23. The system of claim 18, the at least one communication enabled circuit breaker to record metering information, fault signatures, operating conditions, breaker status, or a combination thereof in response to receiving a control signal from the circuit breaker controller including an indication to report status.

* * * * *